(12) United States Patent
Watanabe et al.

(10) Patent No.: US 8,602,299 B2
(45) Date of Patent: Dec. 10, 2013

(54) MOBILE TERMINAL DEVICE

(75) Inventors: Takaaki Watanabe, Kanagawa (JP);
Tatsuya Yano, Kanagawa (JP); Yasuhito Kanemaki, Kanagawa (JP); Michiaki Hiraoka, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 54 days.

(21) Appl. No.: 12/740,337

(22) PCT Filed: Oct. 23, 2008

(86) PCT No.: PCT/JP2008/069187
§ 371 (c)(1),
(2), (4) Date: Jun. 11, 2010

(87) PCT Pub. No.: WO2009/057496
PCT Pub. Date: May 7, 2009

(65) Prior Publication Data
US 2010/0258626 A1  Oct. 14, 2010

(30) Foreign Application Priority Data

Oct. 29, 2007  (JP) ................................. 2007-280134
Oct. 29, 2007  (JP) ................................. 2007-280135
Oct. 29, 2007  (JP) ................................. 2007-280136

(51) Int. Cl.
*G06K 7/00*  (2006.01)
(52) U.S. Cl.
USPC .......................................... 235/380; 235/375
(58) Field of Classification Search
USPC ................................. 235/375, 380
See application file for complete search history.

(56) References Cited

U.S. PATENT DOCUMENTS

2005/0191970 A1  9/2005  Hasegawa
2005/0233763 A1  10/2005  Kim et al.

FOREIGN PATENT DOCUMENTS

| JP | H08-129531 | 5/1996 |
| JP | H10-065357 | 3/1998 |
| JP | 2004-222170 | 8/2004 |
| JP | 2007-109036 | 4/2007 |
| KR | 2005-0007678 A | 1/2005 |
| KR | 2005-0087708 A | 8/2005 |
| WO | WO01-31896 | 5/2001 |
| WO | WO2004-004292 | 1/2004 |

OTHER PUBLICATIONS

Machine translation of JP 2007-109036.*
International Search Report for PCT/JP2008/069187 issued Dec. 2, 2008, 4 pages.
Office Action dated Nov. 29, 2011, issued in counterpart Korean Patent Application No. 10-2010-7010244.

(Continued)

*Primary Examiner* — Michael G Lee
*Assistant Examiner* — Matthew Mikels
(74) *Attorney, Agent, or Firm* — Procopio, Cory, Hargreaves & Savitch LLP

(57) ABSTRACT

A mobile terminal device having a structure suitable for insertion and removal of a card from the device with a battery held in a battery holding part. A mobile phone 1 has a housing body 21 having a battery holding part 19 holding a battery 17 and has a cover member 23 covering the battery holding part 19. In the battery holding part 19, a second card insertion part 27 is provided in a region not concealed by the battery 17 when the battery 17 is held in the battery holding part 19 and covered by the cover member 23. The second card insertion part 27 in which a second card C2 inserted is covered together with the battery 17 by the cover member 23.

14 Claims, 16 Drawing Sheets

(56) References Cited

OTHER PUBLICATIONS

Notice of Reasons for Rejection dated Feb. 5, 2013, issued in counterpart Japanese application No. 2012-280134.

Notice of Reasons for Rejection dated Feb. 5, 2013, issued in counterpart Japanese application No. 2012-280135.

Notice of Reasons for Rejection dated Feb. 5, 2013, issued in counterpart Japanese application No. 2012-280136.

* cited by examiner

FIG. 1A
FIG. 1B
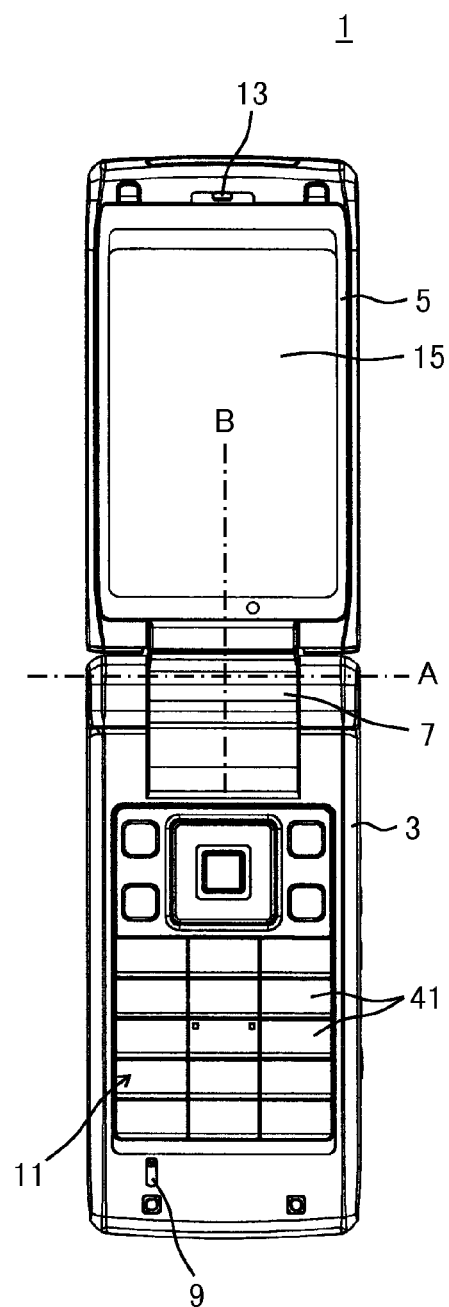
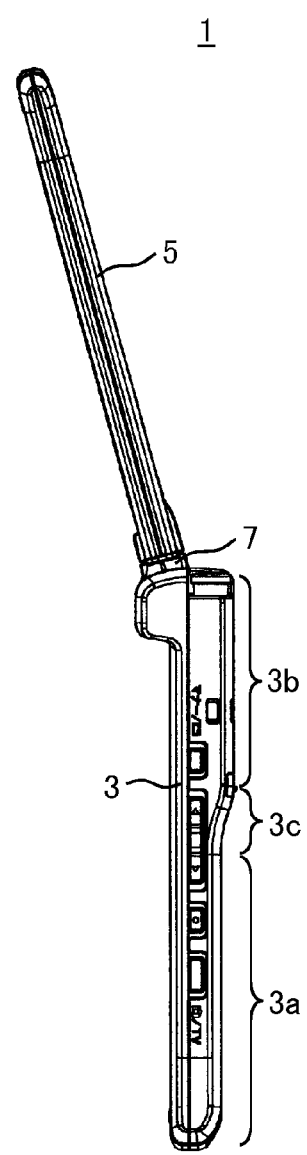

MOBILE TERMINAL DEVICE

TECHNICAL FIELD

The present invention relates to a mobile terminal device such as mobile phone, PDA (personal digital assistant), digital camera, game machine, or the like.

BACKGROUND ART

A mobile terminal device capable of insertion and removal of an IC (integrated circuit) card is known. For example, a mobile phone capable of insertion and removal of an IC card is known. IC cards inserted to the mobile phone include, for example, SIM (subscriber identity module) cards and UIM (universal subscriber identity module) cards.

SIM cards and UIM cards are for enabling replacement of mobile phones or enabling utilization of a plurality of mobile phones while using the same phone number and store information capable of specifying the phone number. Insertion and removal of such a card in a state where the power of the mobile phone is turned on is not preferred. Therefore, generally an insertion part (opening) of this type of card is configured so that a card cannot be inserted and removed unless the battery is detached from the mobile phone. For example, Patent Literature 1 discloses a mobile phone providing an insertion part for inserting an SIM card on an inner wall of a battery holding part of a housing.

On the other hand, as an IC card to/from which music data, image data, etc. are suitably written and read in accordance with operation of the user, a memory card such as an SD card or the like is known. It is preferred that such the memory card can be inserted and removed even in a state where the power of the mobile phone is turned on. Therefore, the insertion part of a memory card is generally provided at the outside of the housing unlike the insertion part of a SIM card or UIM card explained above.

Patent Literature 1: Japanese Patent Publication (A) No. 2004-222170

DISCLOSURE OF INVENTION

Problem to be Solved by the Invention

In Patent Literature 1, an insertion part of a card (memory card) designed to be inserted and removed in a state with a battery held in a battery holding part is provided at the outside of the housing. When providing the insertion part of the card at the outside of the housing in this way, a cap for concealing the insertion part to prevent entry of dust etc. from the insertion part is provided. For this reason, the number of parts becomes larger. Further, design restrictions arise. The mobile phone of Patent Literature 1 is configured so that an SIM card and a memory card can be mounted stacked over each other. In this case, in order to make it possible to insert the memory card from the outside of the housing, it is necessary to arrange even the insertion part of the SIM card near the outside of the housing, so the degree of freedom of design is low. If the insertion part of the memory card is provided in the same way as the insertion part of the SIM card, the memory card cannot be inserted and removed unless the battery is detached from the battery holding part. This is inconvenient.

Therefore, preferably, there is provided a mobile terminal device having a structure suitable for insertion and removal of a card in a state with a battery held in a battery holding part without imposition of design restrictions.

Means for Solving the Problem

A mobile terminal device of the present invention has a housing having a battery holding part holding the battery and a cover member covering the battery holding part. In the battery holding part, a first card insertion part is provided in a region not concealed by the battery when the battery is held in the battery holding part and covered by the cover member. The first card insertion part in which the card inserted is covered together with the battery by the cover member.

Effects of the Invention

According to the present invention, there is provided a mobile terminal device having a structure suitable for insertion and removal of a card in a state with a battery held in a battery holding part without imposition of design restrictions.

BRIEF DESCRIPTION OF DRAWINGS

FIG. 1 A front view and a side view showing an appearance of a mobile phone according to an embodiment of the present invention in an open state.

EXPLANATION OF REFERENCES

1 . . . mobile phone (mobile terminal device), 17 . . . battery, 19 . . . battery holding part, 21 . . . housing body (housing), 21a . . . inner wall, 23 . . . cover member, 25 . . . first card insertion part, 27 . . . second card insertion part, 27a . . . guide part, 33 . . . main board, 35c . . . engagement part, 35 . . . frame member, 49 . . . first card holder, 51 . . . second card holder, C1 . . . first card, and C2 . . . second card.

BEST MODE FOR CARRYING OUT THE INVENTION

Figure 2:
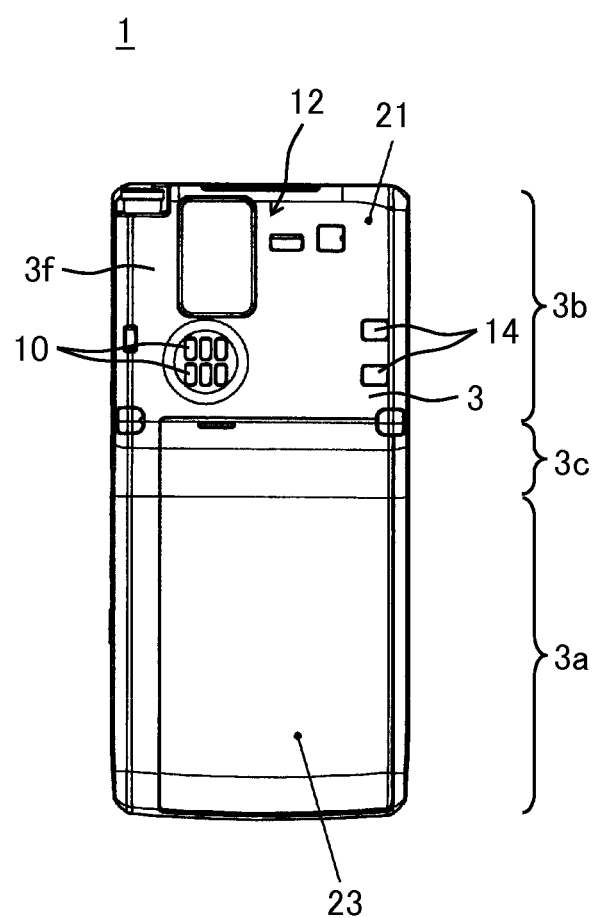
FIG. 2 A back view showing the mobile phone of FIG. 1 in a closed state.

FIG. 1A is a front view showing an appearance of a mobile phone 1 constituting a mobile terminal device according to an embodiment of the present invention in an open state. FIG. 1B is a side view showing the appearance of the mobile phone 1 in the open state. FIG. 2 is a back view (view from a deep side of the paper surface of FIG. 1A and from the right side of the paper surface of FIG. 1B) showing the appearance of the mobile phone 1 in a closed state.

The mobile phone 1 is configured as a mobile terminal device having a so-called biaxial hinge. Specifically, the mobile phone 1 has a first housing 3 and second housing 5 (FIG. 1A and FIG. 1B) and a connecting housing 7 (FIG. 1A and FIG. 1B). The connecting housing 7 is connected to the first housing 3 so that it can turn relative to the first housing 3 about a first rotation axis A (FIG. 1A). Further, the connecting housing 7 is connected to the second housing 5 so that it can turn relative to the second housing 5 about a second rotation axis B (FIG. 1A). Note that, the first housing 3, second housing 5, and connecting housing 7 configure the housing of the mobile phone 1 as a whole.

The first housing 3 and the second housing 5 are formed in, for example, generally thin box shapes and are connected to each other at single ends in the longitudinal direction. The first housing 3 and the second housing 5 are formed so that their contours generally coincide with each other in the closed state as shown in FIG. 2. The first housing 3, as shown in FIG. 1B, has a first region part 3a opposite to the connecting housing 7, a second region part 3b on the connecting housing 7 side which is thicker than the first region part 3a, and a border part 3c between the first region part 3a and the second region part 3b.

In the first housing 3, for example, as shown in FIG. 1A, at the surface facing the second housing 5 in the closed state, a sound pickup hole 9 of a microphone 87 (see FIG. 15) for speaking and an operation part 11 accepting operations of the user are provided. Further, in the first housing 3, for example, as shown in FIG. 2, at the back surface 3f which becomes the opposite side to the second housing 5 in the closed state, sound holes 10 of a speaker 85 (see FIG. 15) for reporting incoming call etc., an imaging part 12, and charge terminals 14 for charging the mobile phone 1 are provided. Note that, the sound holes 10, imaging part 12, and charge terminals 14 are provided in the second region part 3b.

In the second housing 5, for example, as shown in FIG. 1A, a sound hole 13 of a speaker 83 (see FIG. 15) for speaking and a main display part 15 for displaying images including graphics, text, etc. are provided. Note that, on the back surface of the second housing 5, for example, a not shown sub-display part is provided.

Referring to FIG. 3 and FIG. 4, a summary of the method of insertion/removal of a SIM card or other IC card or a memory card in the mobile phone 1 will be given.

Figure 3A:
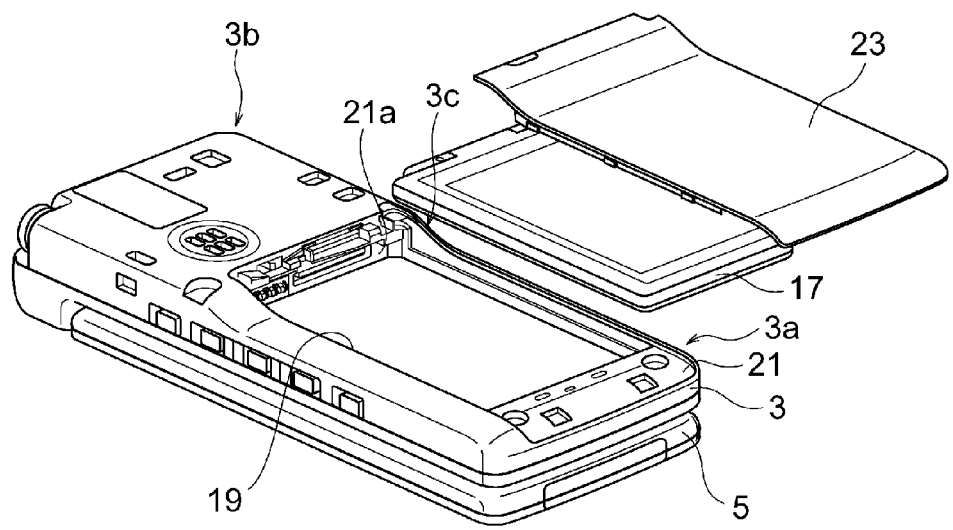
FIG. 3 Perspective views showing the mobile phone of FIG. 1 in a state where a cover member and a battery are detached.

FIG. 3A is a perspective view showing the mobile phone 1 in the closed state from the back side of the first housing 3 (in a direction the same as FIG. 2) while detaching part of the members.

The first housing 3 is configured so that the battery 17 can be attached to and detached from the inside. Specifically, the first housing 3 has a housing body 21 (an example of a housing) provided with a battery holding part 19 for holding the battery 17 and has a cover member 23 which covers the battery holding part 19 and can be attached to and detached from the housing body 21.

The battery holding part 19 is formed recessed in the first region part 3a and the border part 3c with the back side as the recessed part. The cover member 23 is placed over on the battery holding part 19. The cover member 23 forms a portion in the first region part 3a and the border part 3c in the back surface 3f of the first housing 3 (the surface on the front side of the paper surface of FIG. 2 and the surface above the paper surface in FIG. 3A). Note that, in the housing body 21, the portion of the second region part 3b is thicker than the portion of the first region part 3a.

Figure 3B:
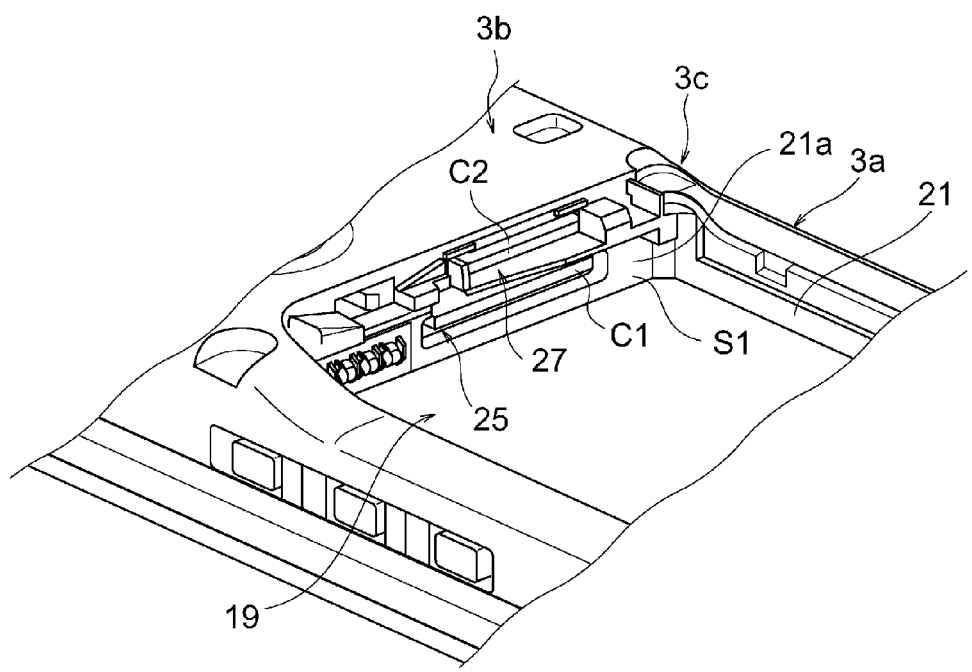

FIG. 3B is a partly enlarged view of FIG. 3A. Specifically, FIG. 3B shows a vicinity of the inner wall 21a on the second region part 3b side in the inner walls of the battery holding part 19.

At the inner wall 21a, a first card insertion part 25 in which the first card C1 may be inserted and a second card insertion part 27 in which the second card C2 may be inserted are provided. The second card insertion part 27 is opened at a position that becomes the upper side of the paper surface of FIG. 3B (the side covered by the cover member 23) relative to the first card insertion part 25.

The first card C1 is, for example, an SIM card or UIM card. The first card C1 is for enabling replacement of the mobile phone or enabling utilization of a plurality of mobile phones while using the same phone number. The first card C1 stores, for example, identification information specifying a carrier or subscriber of the communication system as information capable of specifying the phone number. The first card C1 is formed, for example, in a generally rectangular shape.

The second card C2 is, for example, a memory card such as an SD card or the like. The memory card is for suitably writing and reading information of music, images, or the like in accordance with an operation of the user on the operation part 11. The second card C2 is formed, for example, in a generally rectangular shape.

Figure 4A:
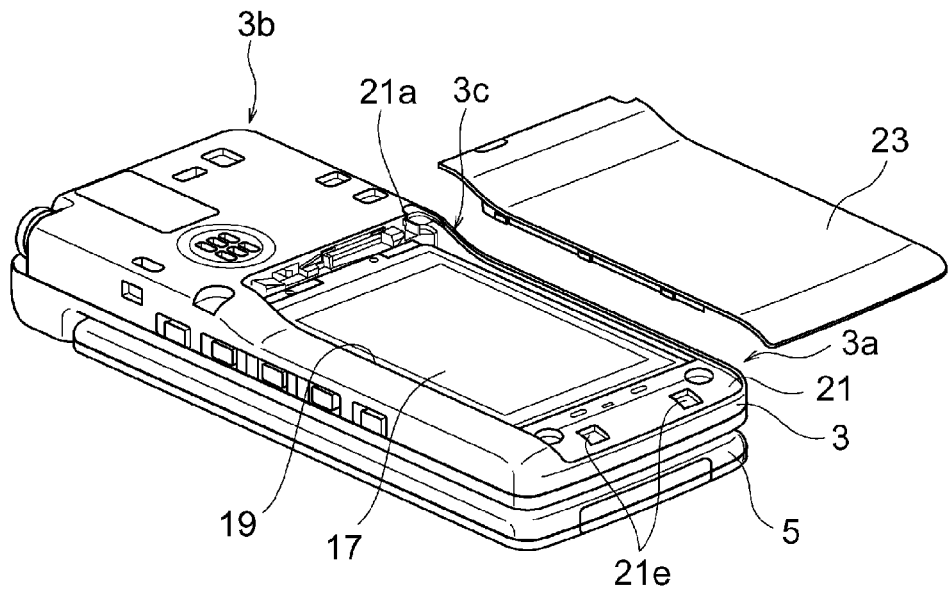
FIG. 4 Perspective views showing the mobile phone of FIG. 1 in a state where the cover member is detached.

FIG. 4A is a perspective view showing a state of holding the battery 17 in the battery holding part 19 from the state of FIG. 3A.

The battery 17 is formed, for example, in a generally thin box shape. The planar shape of the battery holding part 19 is formed to a shape with which the battery 17 fits, that is, a generally rectangular shape. The battery holding part 19 is provided in the first region part 3a to a depth of the same extent as the thickness of the battery 17. Therefore, the surface of the battery 17 on the upper side of the paper surface of FIG. 4A (the side covered by the cover member 23) becomes generally the same plane as the surface on the upper side of the paper surface of FIG. 4A in the first region part 3a of the housing body 21.

Figure 4B:
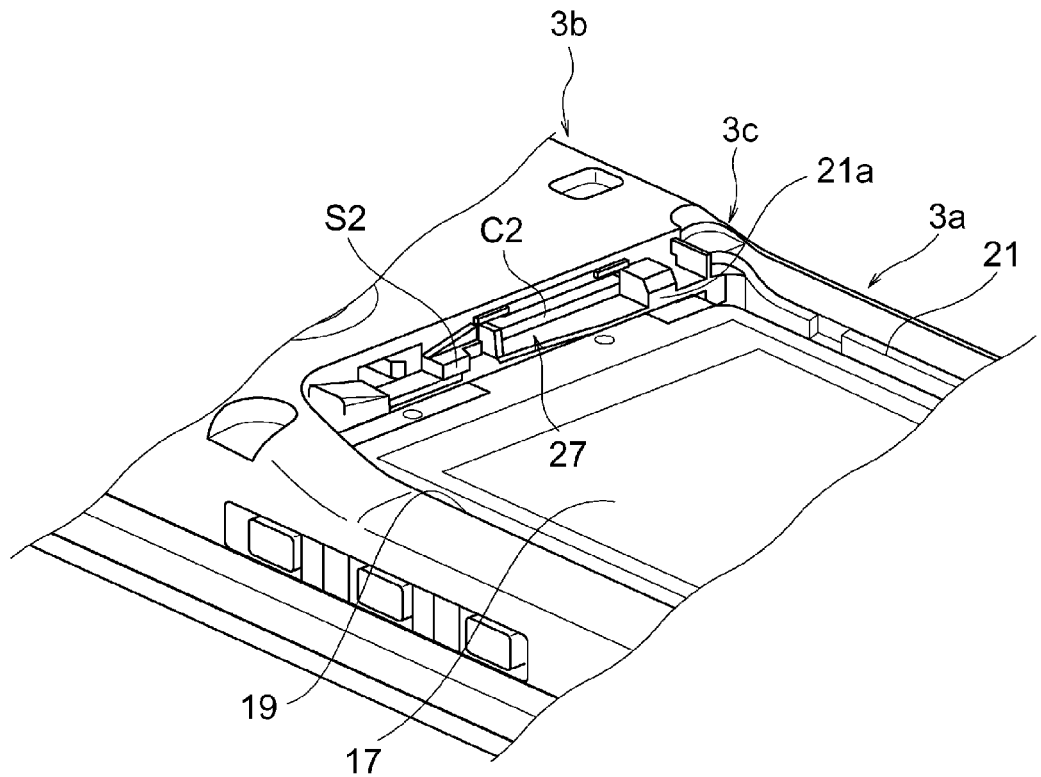

FIG. 4B is an enlarged view showing the vicinity of the inner wall 21a of FIG. 4A.

As explained above, in the housing body 21, the portion at the second region part 3b is thicker than the portion at the first region part 3a. Further, the battery 17 and the portions of the housing body 21 in the first region part 3a become generally the same plane in their surfaces at the upper side of the paper surface of FIG. 4B. Therefore, in the inner wall 21a, even when the battery 17 is held in the battery holding part 19, the region on the upper side of the paper surface of FIG. 4B is not concealed by the thickness of the battery 17 (does not face the side surface of the battery 17), but is exposed. Namely, the inner wall 21a has a covered region S1 concealed by the thickness of the battery 17 and an exposed region S2 not concealed by the thickness of the battery 17 (FIG. 3B).

Further, as shown in FIG. 3B and FIG. 4B, the first card insertion part 25 is provided in the covered region S1. Further, the second card insertion part 27 is provided in the exposed region S2. Therefore, insertion/removal of the first card C1 to/from the first card insertion part 25 is permitted only in a state where the battery 17 is detached from the battery holding part 19. On the other hand, insertion/removal of the second card C2 to/from the second card insertion part 27 is permitted even in a state where the battery 17 is held in the battery holding part 19.

Figure 11:
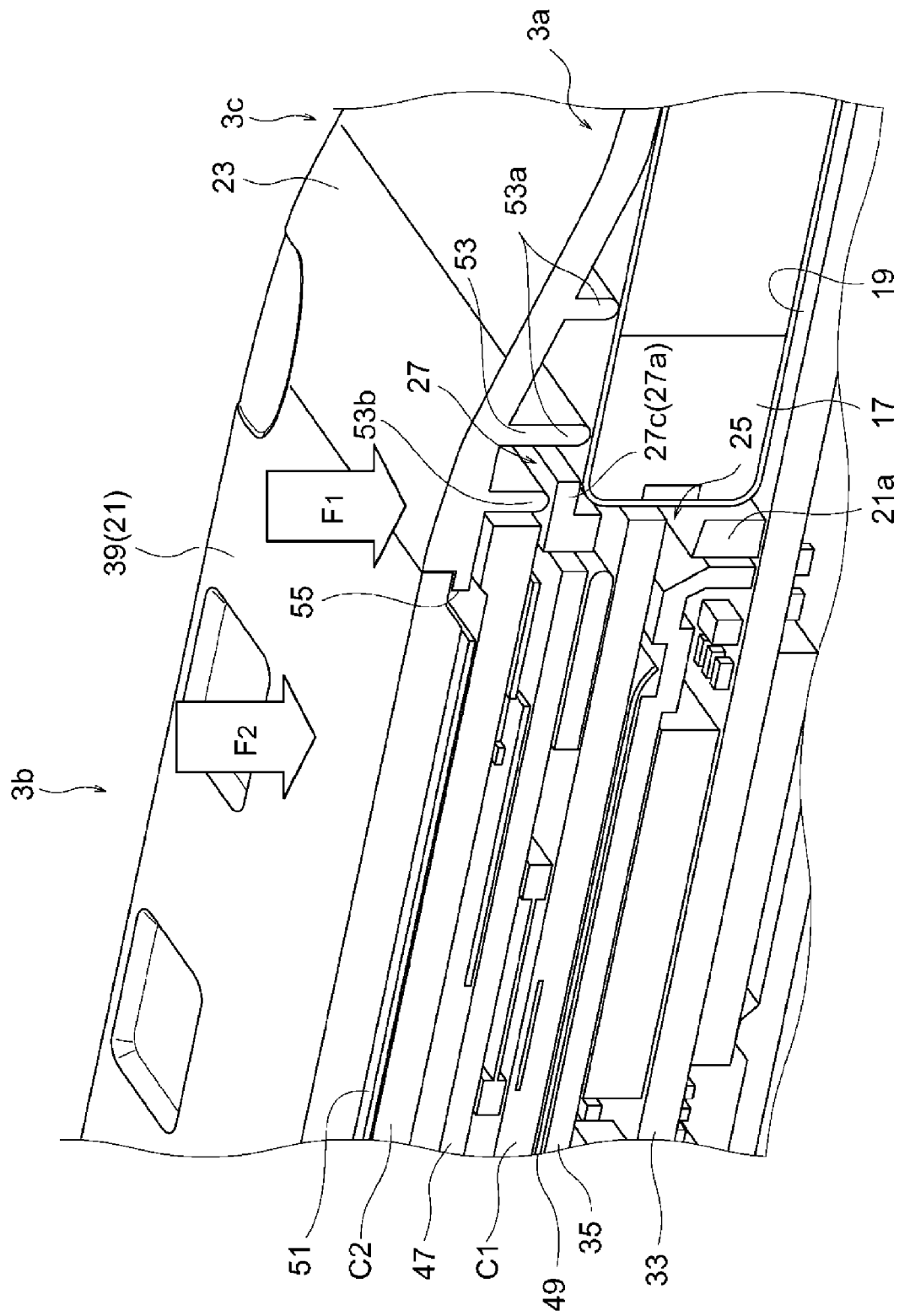
FIG. 11 A perspective view showing a cross-section taken along the XI-XI line in FIG. 10.

However, the second card insertion part 27 is covered and concealed together with the battery 17 by the cover member 23 when the cover member 23 is attached to the housing body 21 (see FIG. 2 and FIG. 11).

Below, a detailed explanation will be given of the structure of the internal portion etc. of the mobile phone 1 relating to the first card C1 and second card C2 explained above.

Figure 5:
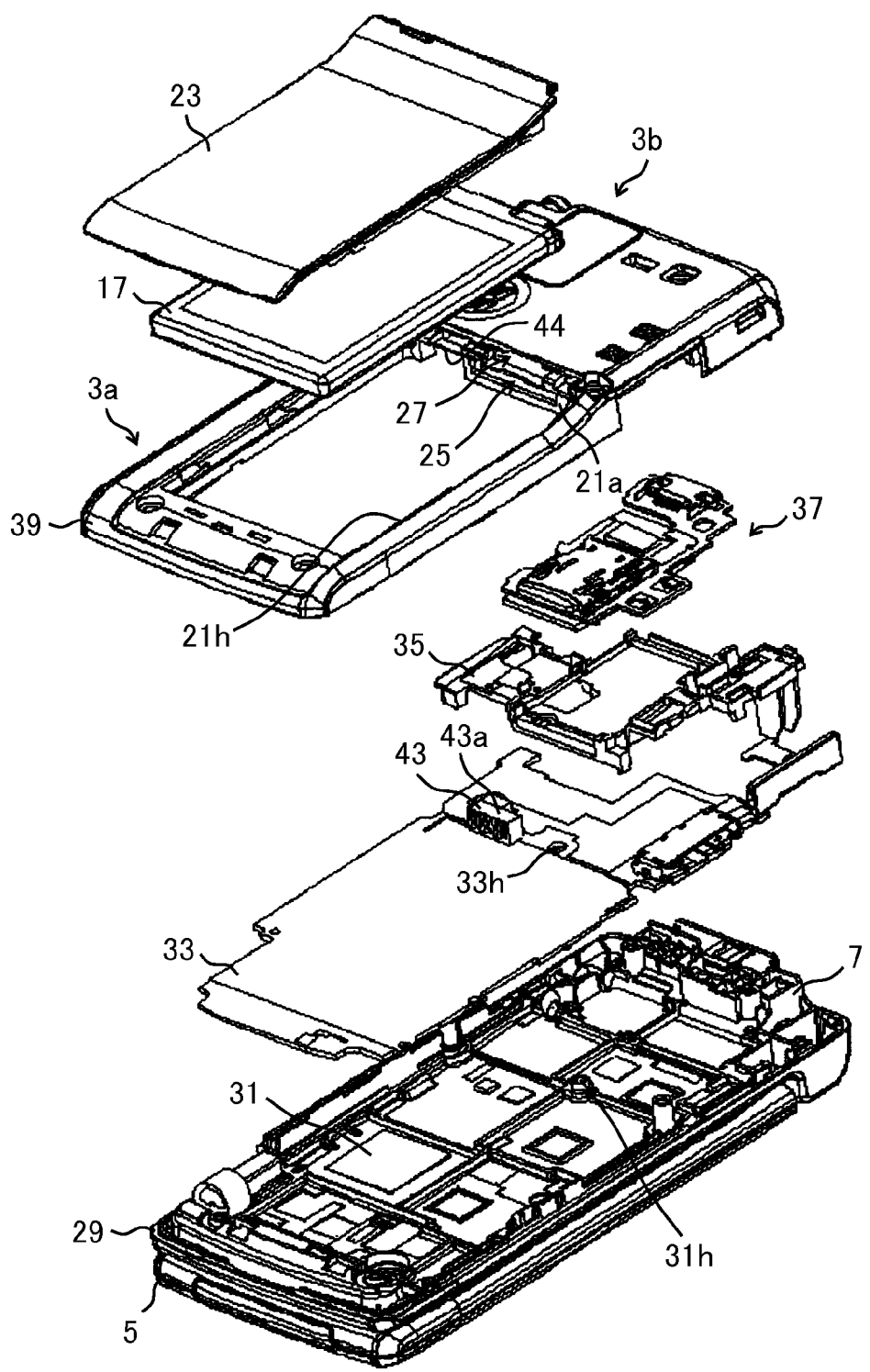
FIG. 5 A broken down perspective view of the mobile phone of FIG. 1.

FIG. 5 is a perspective view showing the mobile phone 1 in the closed state by disassembly of the first housing 3.

In the first housing 3, from the lower side of the paper surface of FIG. 5 (the front side of the first housing 3, the side facing the second housing 5 in the closed state), a front case 29 configuring the front side of the housing body 21, a shield case 31 shielding a high frequency circuit etc., a main board 33 configured by a circuit board, a frame member 35 utilized for holding electronic parts and so on, a sub-board assembly 37 on which the first card C1 and second card C2 are mounted, a rear case 39 configuring the back side of the housing body 21, and the above-explained battery 17 and cover member 23 are stacked.

Note that, in the first housing 3, other than these, an FPC which is laid on the surface on the front case 29 side of the shield case 31 and is provided with a plurality of pressure switches etc., a key sheet which is covered on the FPC and is fixed with a key top 41 (FIG. 1), and other parts are provided.

Each of the front case 29 and rear case 39 is, for example, integrally shaped by resin. The front case 29 and rear case 39 are fixed to each other by, for example, a not shown screw inserted in a hole formed at one case (for example, the rear case 39) being screwed into a screw boss formed in the other (for example, the front case 29).

By mutual fastening of the front case 29 and the rear case 39 arranged facing each other, the key sheet, shield case 31, main board 33, and other various parts arranged between these are clamped between the front case 29 and the rear case 39. Due to this, the various parts are fixed to the housing body 21 configured by the front case 29 and the rear case 39.

The shield case 31 is formed by a metal or formed by resin on the surface of which a metal film is provided and has electrical conductivity. The shield case 31 is connected to a ground line of the main board 33. The shield case 31 has ribs projecting to the main board 33 side and abutting against the main board 33. The ribs extend vertically and laterally so as to partition the main board 33.

The main board 33 is configured by, for example, a so-called rigid board using a hard resin as the base. The main board 33 has, for example, a broadness covering the first region part 3a and second region part 3b. The main board 33 is provided with, for example, a battery terminal 43 supplied with electric power from the battery 17, a not shown high frequency circuit for wireless communication utilizing signals, and so on.

The battery terminal 43 has a terminal housing 43a and a contact 43b (see FIG. 13) projecting from the terminal housing 43a. The contact 43b is biased to the projection direction by a not shown bias member (for example, spring) provided in the terminal housing 43a. When the mobile phone 1 is assembled, the side of the battery terminal 43 from which the contact 43b projects is exposed from a terminal use opening 44 provided in the inner wall 21a (see FIG. 13). Then, when the battery 17 is held in the battery holding part 19, the contact 43b elastically abuts against a not shown power terminal provided on the end surface on the inner wall 21a side of the battery 17. Note that, the terminal use opening 44 is provided by formation of a cutaway at an edge part on the main board 33 side of the inner wall 21a. Further, the terminal use opening 44 is adjacent to the first card insertion part 25 and second card insertion part 27.

Inner walls (including the inner wall 21a) of the battery holding part 19 explained above are configured by the rear case 39. Therefore, the first card insertion part 25 and second card insertion part 27 are also provided in the rear case 39. In the rear case 39, a through hole 21h is formed in a portion where the battery holding part 19 is formed. The main board 33 is exposed at the back side of the housing body 21 from the through hole 21h and configures the bottom surface of the battery holding part 19. Note that, an insulating seal etc. may be adhered to the portion of the main board 33 which is exposed from the through hole 21h as well.

Figure 6A:
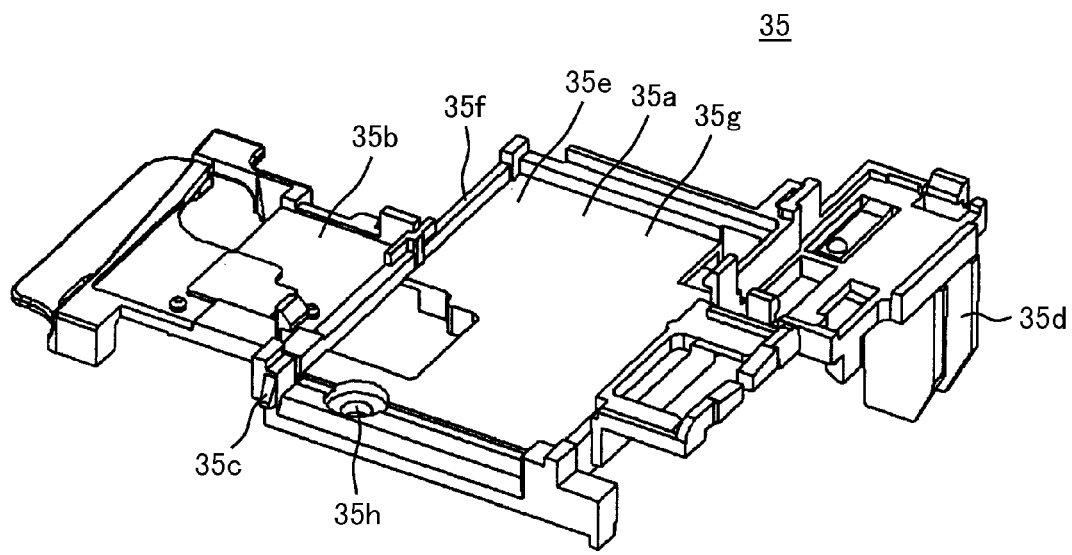
FIG. 6 Perspective views showing a frame member of the mobile phone of FIG. 1.
Figure 6B:
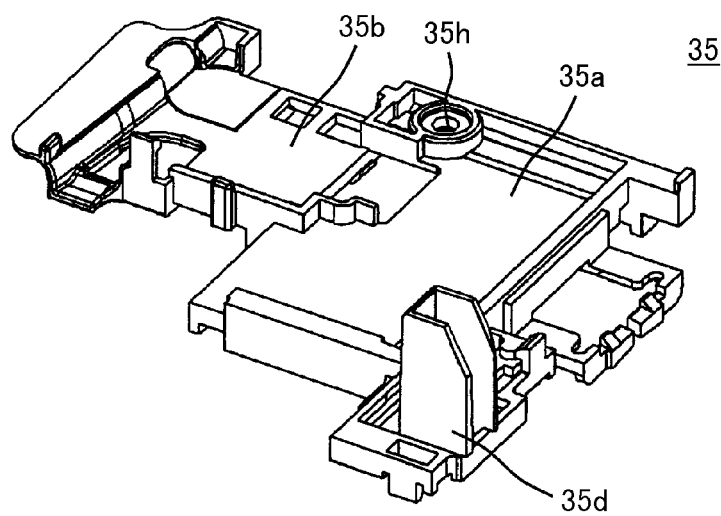

FIG. 6A is a perspective view showing the frame member 35 from the back surface 3f side of the first housing 3 (the side covered by the cover member 23). FIG. 6B is a perspective view showing the frame member 35 from the main board 33 side.

The frame member 35 is, for example, integrally formed by a resin. The frame member 35 is formed to, for example, a generally thin member as a whole. The frame member 35 has a first holding part 35a holding the sub-board assembly 37 on the back surface 3f side, a second holding part 35b holding the speaker 85 (see FIG. 15) reporting incoming calls etc. on the back surface 3f side, a positioning part 35d for positioning a not shown cable for connecting electronic circuits in the first housing 3 and electronic circuits in the second housing 5, and so on.

The first holding part 35a is configured by, for example, as shown in FIG. 6A, provision of a side wall part 35f around a plate-like base part 35e. Therefore, in the first holding part 35a, a recessed part 35g is formed on the sub-board assembly 37 side. The planar shape of the recessed part 35g is, for example, a rectangle.

In the frame member 35, a hole part 35h in which a screw 45 (see FIG. 13) is inserted is formed. The screw 45 is inserted into the hole part 35h and the hole part 33h (FIG. 5) formed in the main board 33 and screwed with a internal thread part 31h (FIG. 5) formed in the shield case 31. Due to this, the frame member 35 is fixed to the main board 33. Note that, between the frame member 35 and the main board 33, space for arrangement of electronic parts mounted on the main board 33 is formed (see FIG. 11).

Figure 7:
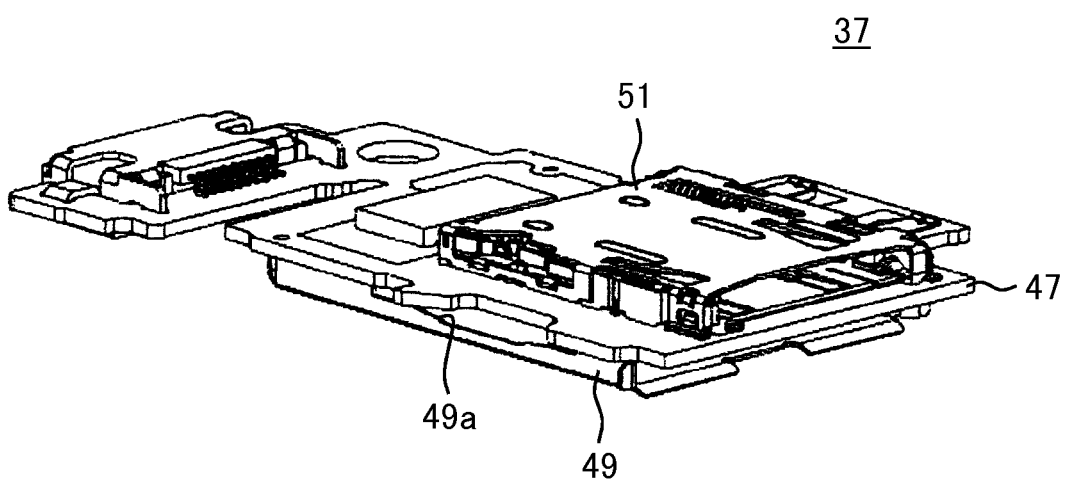
FIG. 7 A perspective view showing a sub-board assembly of the mobile phone of FIG. 1.

FIG. 7 is a perspective view showing the sub-board assembly 37 from the back surface 3f side (side covered by the cover member 23).

The sub-board assembly 37 has a sub-board 47, a first card holder 49 in which the first card C1 is mounted, and a second card holder 51 in which the second card C2 is mounted. The first card holder 49 is mounted at one surface of the sub-board 47 (the surface on the lower side of the paper surface of FIG. 7, the surface on the frame member 35 side). The second card holder 51 is mounted on the other surface of the sub-board 47 (the surface on the upper side of the paper surface of FIG. 7, the surface on the rear case 39 side). Note that, the sub-board assembly 37 has, other than these, an IC for driving the imaging part 12 and other suitable parts which are mounted on the sub-board 47.

The sub-board 47 is, for example, configured by a so-called rigid board using a hard resin as the base. The outer shapes of the first card holder 49 and the second card holder 51 are formed by, for example, a metal. A space capable of holding the first card C1 is formed in the first card holder 49. In the space, a not shown terminal connecting the first card C1 and the sub-board 47 is provided. In the same way, a space capable of holding the second card C2 is formed in the second card holder 51. In the space, a not shown terminal connecting the second card C2 and the sub-board 47 is provided.

The second card holder 51 is configured so as to insert and remove the second card C2 by the so-called "push-push" method. Namely, at the time of insertion of the second card C2, the second card C2 is inserted deeper than a predetermined position whereby it is locked in the second card holder 51. At the time of removal of the second card C2, locking is released and removal of the second card C2 becomes possible by pushing it again deeper than the predetermined position. Further, the second card C2 projects from the second card holder 51 by a predetermined amount by the biasing force of a spring or the like. Therefore, the second card C2 must project from the second card insertion part 27 in a state mounted at the second card holder 51. The method of insertion and removal of the first card C1 to/from the first card holder 49 will be explained later.

The sub-board assembly 37 is positioned by fitting the first card holder 49 in the recessed part 35g formed in the first holding part 35a of the frame member 35. At this time, the sub-board 47 is placed (stacked) on the side wall part 35f of the first holding part 35a. Then, when the front case 29 and the rear case 39 are fixed, the sub-board 47 is clamped by the side wall part 35f and the rear case 39, whereby the sub-board assembly 37 is fixed to the first housing 3.

Figure 8:
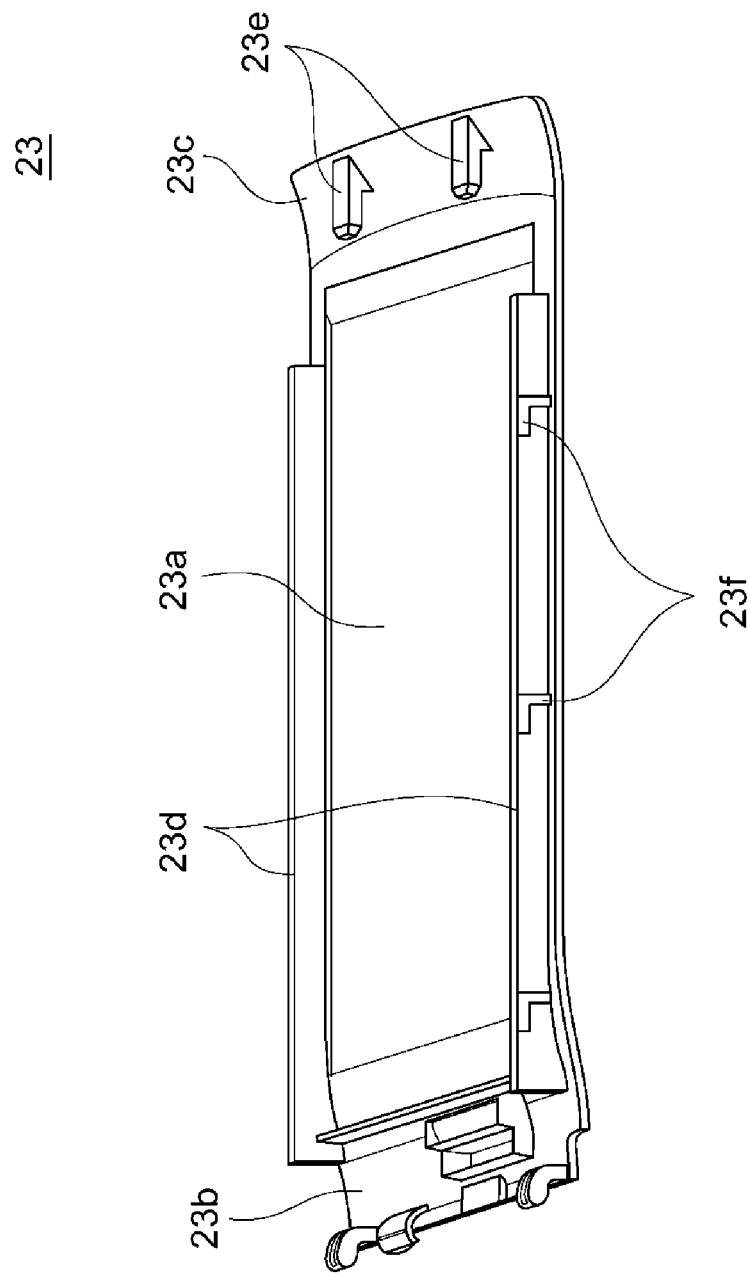
FIG. 8 A perspective view showing an inner side surface of the cover member of the mobile phone of FIG. 1.

FIG. 8 is a perspective view showing the inner side surface of the cover member 23.

The cover member 23 is, for example, integrally shaped by a resin. The cover member 23 is formed in generally a plate shape as a whole. Specifically, the cover member 23 has a flat plate part 23a of a flat plate shape configuring the back surface of the first region part 3a, an inclined part 23b configuring the back surface of the border part 3c and inclined relative to the flat plate part 23a, and a curved part 23c of a curved shape configuring the back surface of the end part on the first region part 3a side of the first housing 3.

On the inner side surface of the flat plate part 23a, a guided part 23d for guiding the cover member 23 in the long direction of the housing body 21 (left/right direction on paper surface of FIG. 8, the same direction as the insertion direction of the second card C2) with respect to the housing body 21 is provided. The guided part 23d is formed in, for example, a wall state along the edge part of the flat plate part 23a on the sideward side of the flat plate part 23a and is inserted in a not shown guide groove provided in the housing body 21. Due to this, the cover member 23 is positioned in a short direction of the housing body 21 and is guided in the long direction of the housing body 21.

In the cover member 23, a plurality of engaged parts engaged with the housing body 21 when sliding the cover member 23 in the longitudinal direction of the housing body 21 with respect to the housing body 21 are provided in suitable shapes at suitable positions. For example, the curved part 23c is provided with end side engaged parts 23e projecting to the slide direction of the cover member 23. The end side engaged parts 23e are inserted into engagement holes 21e (FIG. 4A) provided in the housing body 21, engaged with the housing body 21 toward the back side (upper side of the paper surface of FIG. 4A, lower side of the paper surface of FIG. 8), and prevent separation of the cover member 23 to the back surface side from the housing body 21. Further, for example, on the side surface of the guided part 23d, a plurality of L-shaped sideward side engaged parts 23f preventing separation of the cover member 23 to the back surface side from to the housing body 21 are provided.

Figure 9:
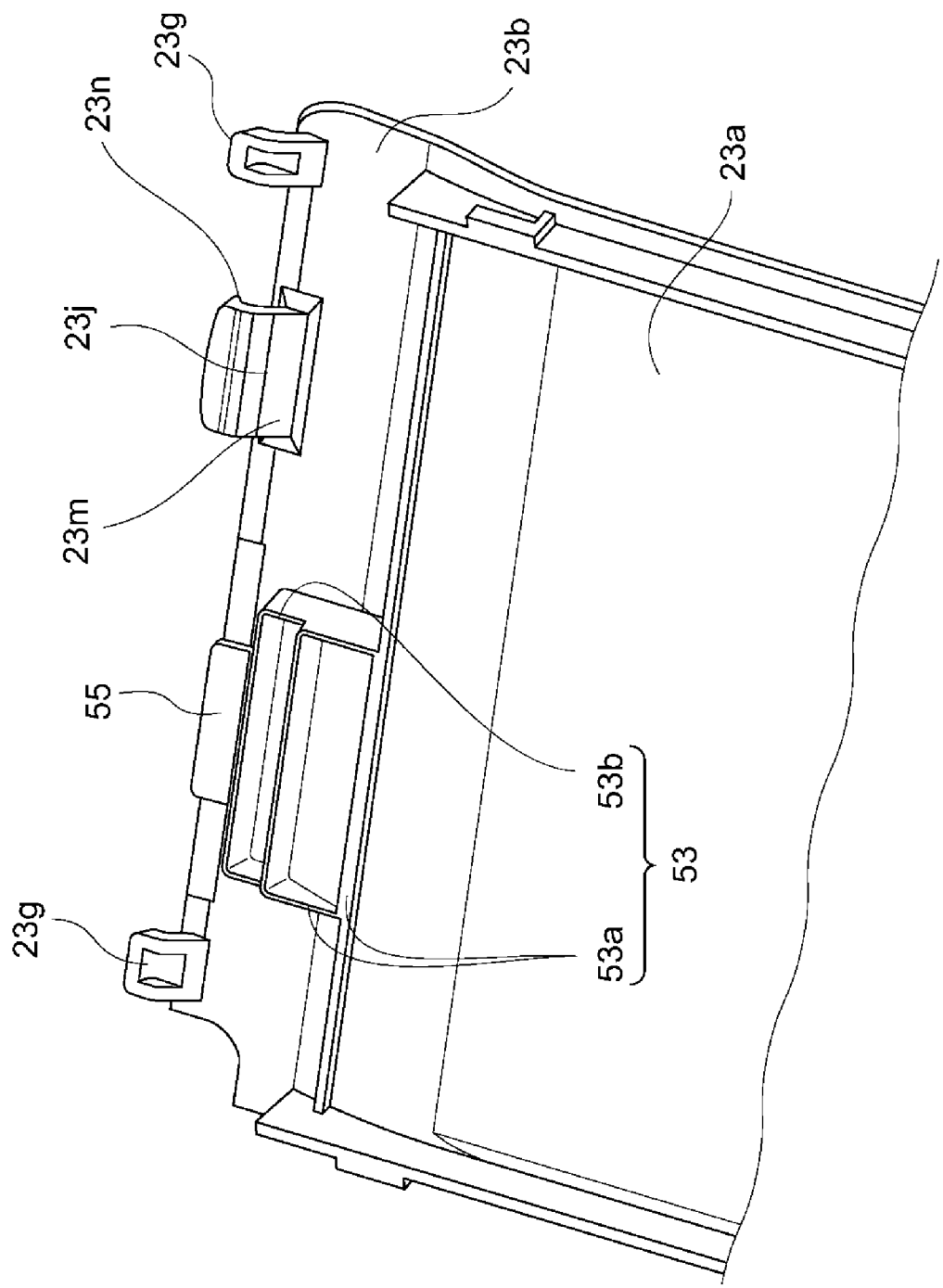
FIG. 9 A partially enlarged view of the cover member of FIG. 8.
Figure 10:
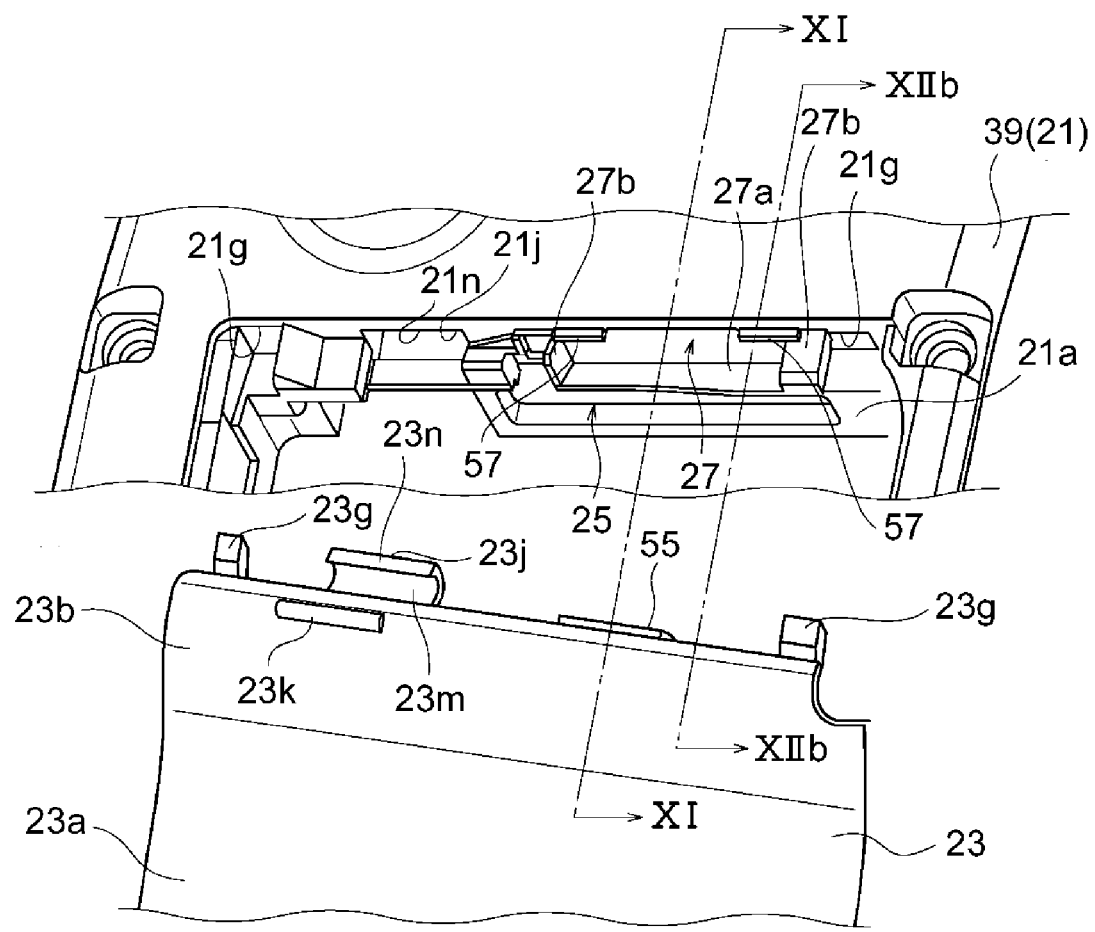
FIG. 10 A perspective view showing a housing body and cover member of the mobile phone of FIG. 1 while partially enlarging these.

FIG. 9 is a perspective view showing the vicinity of the inclined part 23b of the cover member 23 from the inside. FIG. 10 is a perspective view showing the vicinity of the inner wall 21a of the housing body 21 and the vicinity of the inclined part 23b of the cover member 23 from the outside.

The inclined part 23b is provided with inner wall side engaged parts 23g and a slide engaged part 23j engaged with the housing body 21 when sliding the cover member 23 in the longitudinal direction of the housing body 21 with respect to the housing body 21 in the same way as the above-explained end side engaged parts 23e etc.

The inner wall side engaged parts 23g are formed so as to project from the inclined part 23b to the upper side of the paper surface of FIG. 9 and FIG. 10 (second region part 3b side). Further, the inner wall side engaged parts 23g are inserted in engagement holes 21g formed in the inner wall 21a as shown in FIG. 10. Due to this, separation of the cover member 23 to the back surface side from the housing body 21 is prevented.

The slide engaged part 23j has an extended part 23m extending to upper side of the paper surface of FIG. 9 and FIG. 10 from the inclined part 23b and an engagement projection part 23n projecting from the extended part 23m to the outer surface side of the cover member 23 (deep side of the paper surface of FIG. 9, front side of the paper surface of FIG. 10). On the other hand, in the inner wall 21a, an engagement hole 21j in which the slide engaged part 23j is to be inserted is formed as shown in FIG. 10. An opening edge 21n on the upper side of the paper surface of FIG. 10 of the engagement hole 21j projects from the inner side surface of the housing body 21 to the center direction of the engagement hole 21j although it is not particularly shown.

Therefore, when the cover member 23 is slid to the upper side of the paper surface of FIG. 10 relative to the housing body 21, due to elastic deformation of the extended part 23m and the inclined part 23b in the base portion of the extended part 23m (region where the slide engaged part 23j is provided) etc., the engagement projection part 23n passes over the opening edge 21n. Then, the engagement projection part 23n engages with the opening edge 21n from the inside of the inner wall 21a (upper side of the paper surface of FIG. 10) to the outside (lower side of the paper surface of FIG. 10). Due to this, sliding in the detachment direction of the cover member 23 from the housing body 21 (downward direction of the paper surface of FIG. 10) is prohibited.

Further, when detaching the cover member 23 from the housing body 21, the user presses the portion of the extended part 23m in the inclined part 23b from the outer side surface side to the inner side surface side of the cover member 23. Due to this, the inclined part 23b elastically deforms, engagement of the engagement projection part 23n with the opening edge part 21n becomes weak, and sliding of the cover member 23 to the detachment direction from the housing body 21 becomes possible.

As shown in FIG. 10, on the outer side surface of the cover member 23, in the base portion of the extended part 23m, that is, a portion able to weaken the engagement of the slide engaged part with the housing body 21 by pressing, a press mark 23k for prompting a pressing action by the user is provided. The press mark 23k is, for example, formed by a projection part integrally shaped with the cover member 23.

The engagement hole 21j, slide engaged part 23j, and press mark 23k are provided at positions where they are not superposed over the second card insertion part 27 when seen from the back side of the housing body 21 (side covered by the cover member 23).

FIG. 10 also shows the first card insertion part 25 and second card insertion part 27 enlarged. The first card insertion part 25 is configured so that the first card C1 can be inserted into the housing body 21 so as to face the back surface of the housing body 21 (the surface on the side covered by the cover member 23, the surface on front side of the paper surface of FIG. 10). Namely, the first card insertion part 25 is formed in a slit shape having the left/right direction of the paper surface of FIG. 10 (direction along the back surface and inner wall 21a of the housing body 21) as its long direction. In the same way, the second card insertion part 27 is formed in a slit shape so that the second card C2 can be inserted into the housing body 21 so as to face the back surface of the housing body 21 and has the left/right direction of the paper surface of FIG. 10 as its long direction.

Figure 13:
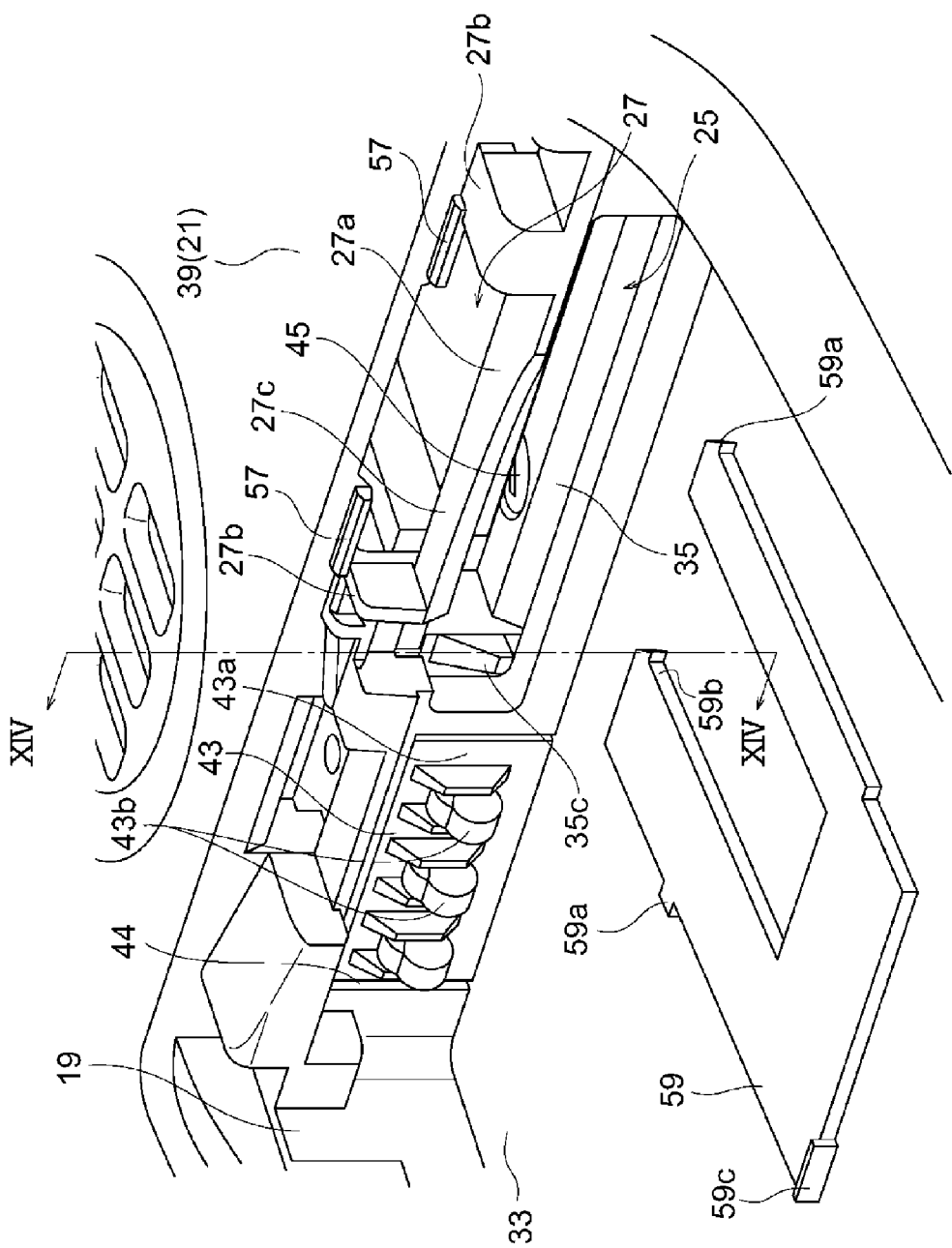
FIG. 13 A perspective view showing part of the inside of a battery holding part of the mobile phone of FIG. 1 partially enlarged.

In the second card insertion part 27, the guide part 27a guiding insertion of the second card C2 is formed so as to extend to the battery holding part 19 side (lower side of the paper surface of FIG. 10) (see FIG. 13 as well). The guide part 27a is formed in a rectangular shape (U-shape) with the side covered by the cover member 23 opened when viewed in the insertion direction of the second card C2. Namely, the guide part 27a has two sideward guide parts 27b abutting against the edge part of the second card C2 and guiding the second card C2 and an inside guide part 27c abutting against the second card C2 opposite to the cover member 23 and guiding the second card C2.

Figure 12A:
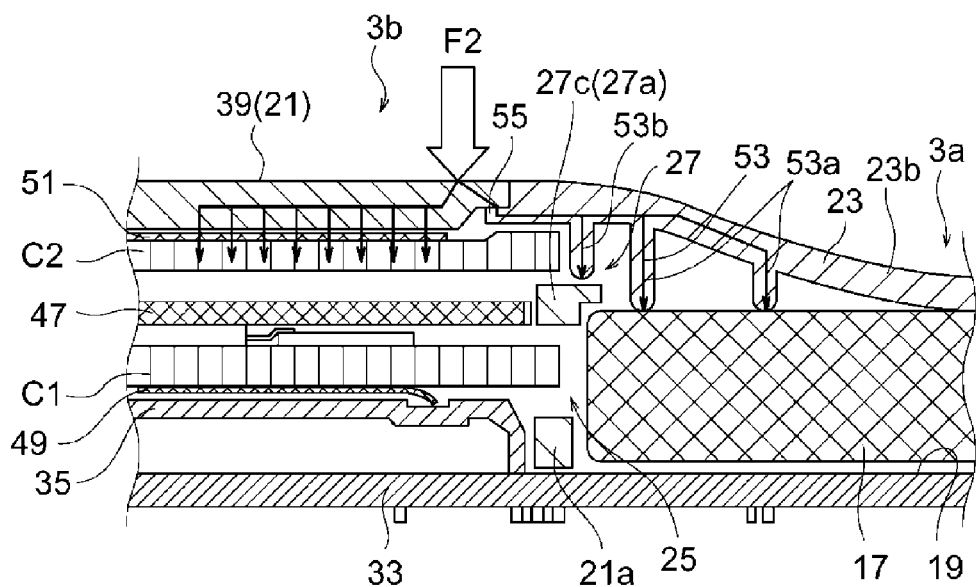
FIG. 12 Cross-sectional views taken along the XI-XI line and XIIb-XIIb line in FIG. 10.
Figure 12B:
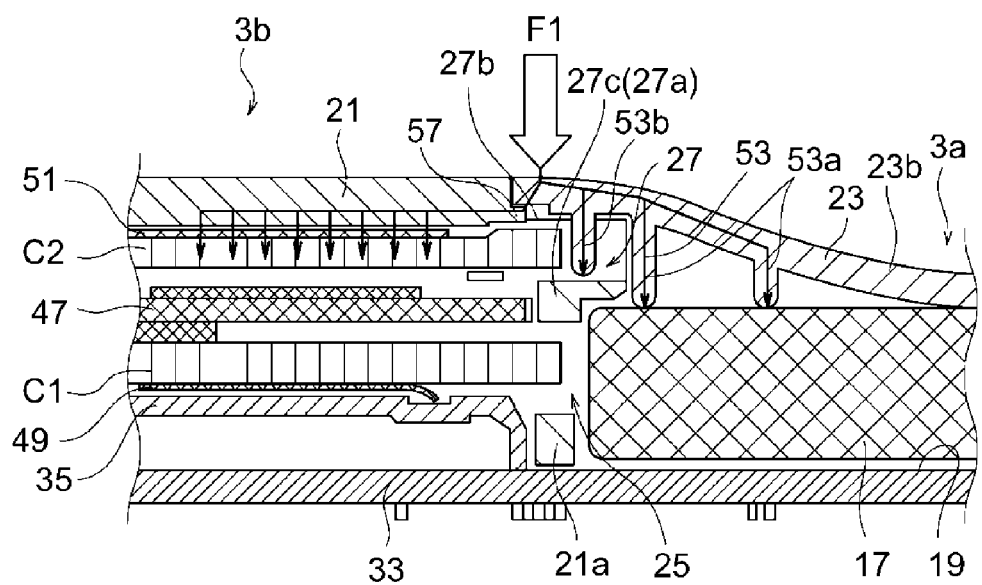

FIG. 11 is a perspective view showing a cross-section of the mobile phone 1 along the XI-XI line in FIG. 10. FIG. 12A is a cross-sectional view showing the generally same cross-section as that in FIG. 11. FIG. 12B is a cross-sectional view of the mobile phone 1 along the XIIb-XIIb line in FIG. 10.

As explained above, in the first region part 3a on the main board 33, the battery 17 and the cover member 23 are sequentially stacked. Further, in the second region part 3b on the main board 33, the frame member 35, first card holder 49, sub-board 47, second card holder 51, and rear case 39 are sequentially stacked. The first card C1 is mounted in the first card holder 49, and the second card C2 is mounted in the second card holder 51.

The first card holder 49 continues to the first card insertion part 25. The first card C1 is inserted from the first card insertion part 25 and mounted in the first card holder 49. In the same way, the second card holder 51 continues to the second card insertion part 27. The second card C2 is inserted from the second card insertion part 27 and mounted in the second card holder 51.

As explained above, the second card holder 51 is a push-push type holder. Therefore, the second card insertion part 27 and second card holder 51 are arranged so that the end part of the second card C2 projects from the inner wall 21a to the battery holding part 19 side in the state with the second card C2 mounted in the second card holder 51. Note, the end part of the second card C2 does not project to the battery holding part 19 side more than the guide part 27a, but only the surface on the cover member 23 side is exposed.

When the battery 17 is held in the battery holding part 19, the end part on the inner wall 21a side is fit between the main board 33 and the guide part 27a. In other words, the guide part 27a can engage with the battery 17 from the side covered by the cover member 23.

The housing body 21 and the cover member 23 are provided with ribs etc. near the inner wall 21a for improving the strength of the mobile phone 1. Specifically, this is as follows.

As shown in FIG. 11, FIG. 12A, and FIG. 12B, at the inner side surface of the inclined part 23b, ribs 53 projecting to the internal side of housing are provided. The ribs 53 have a battery abutment rib 53a which can abut against the surface of the cover member 23 side of the battery 17 and a guide abutment rib 53b which can abut against the side of the inside guide part 27c covered by the cover member 23. Therefore, when an outer force F1 (FIG. 11 and FIG. 12B) is applied to the end part of the inner wall 21a side of the cover member 23, the load is supported through the ribs 53 by the inside guide part 27c and battery 17.

As shown in FIG. 9, the battery abutment rib 53a has, for example, a straight portion crossing the cover member 23 in the direction along the end part on the inner wall 21a side of the cover member 23 and a portion extending in a rectangular shape on the side nearer the inner wall 21a than that straight portion. Further, the guide abutment rib 53b extends in, for example, a rectangular shape on the side nearer the inner wall 21a than the battery abutment rib 53a.

As shown in FIG. 11, FIG. 12A, and FIG. 12B, the guide abutment rib 53b is provided so that it can abut against the end part of the battery holding part 19 side of the second card C2 inserted in the second card insertion part 27 in the insertion direction. Note that, the second card C2 referred to here which can be abutted against by the guide abutment rib 53b and is inserted in the second card insertion part 27 may be mounted in the second card holder 51 or need not be completely mounted in the second card holder 51, but be at least partly inserted in the second card insertion part 27. Preferably, it is mounted in the second card holder 51.

Further, as shown in FIG. 12B, two sideward guide parts 27b can abut against the inner side surface of the cover member 23. Therefore, when the outer force F1 (FIG. 11 and FIG. 12B) is applied to the end part on the inner wall 21a side of the cover member 23, the load is supported by the two sideward guide parts 27b. Namely, the cover member 23 is supported by the guide part 27a at the two ends in the longitudinal direction of the second card insertion part 27.

As shown in FIG. 9, FIG. 10, FIG. 11, and FIG. 12A, the cover member 23 is provided with a cover side extended part 55 which projects from the end part of the cover member 23 abutting against the inner wall 21a. The cover side extended part 55, as shown in FIG. 11 and FIG. 12A, enters into the second card insertion part 27 and abuts against the inner side surface of the back part of the housing body 21 (the portion covering the second card C2). Therefore, when an outer force F2 is applied to the vicinity of the inner wall 21a of the back of the housing body 21, the load is supported through the cover side extended part 55 by the cover member 23.

As shown in FIG. 10 and FIG. 12B, the housing body 21 is provided with housing side extended parts 57 (see FIG. 13 as well) projecting from the inner wall 21a. The housing side extended parts 57 abut against the inner side surface of the end parts of the cover member 23 abutting against the inner wall 21a. Therefore, as shown in FIG. 12B, when the outer force F1 is applied to the vicinity of the inner wall 21a of the back of the cover member 23, the load is supported through the housing side extended parts 57 by the housing body 21 and dispersed to the direction of the second card holder 51 or the like.

Note that, as shown in FIG. 10, the cover side extended part 55 is provided so as to be located at, for example, generally the center in the longitudinal direction of the second card insertion part 27 when the cover member 23 is attached to the housing body 21. The housing side extended parts 57 are provided, for example, at the two ends (two sides of the cover side extended part 55) in the longitudinal direction of the second card insertion part 27. Further, as shown in FIG. 11, FIG. 12A, and FIG. 12B, the second card C2 projects to the battery holding part 19 side from the edge part of opening on the upper side of the paper surface on the cover member 23 side of the second card insertion part 27. The cover side extended part 55 and housing side extended parts 57 are superposed at the end part on the battery holding part 19 side of the second card C2.

The ribs 53 may abut against the guide part 27a or battery 17 in a state where the outer force F1 or F2 is not applied as well. Further, the ribs 53 may approach the guide part 27a or battery 17 with a relatively minute clearance so as to abut by elastic deformation of the first housing 3 when the outer force F1 or outer force F2 is applied. Note, when a clearance is provided, the clearance between the ribs 53 and the guide part 27a or battery 17 is set smaller than a clearance between the end part projecting from the inner wall 21a of the second card C2 and the end part abutted against the inner wall 21a of the cover member 23.

As shown in FIG. 12A and FIG. 12B, the second card holder 51 also contributes to protection of the second card C2 by receiving the outer force F1 and outer force F2. The second card holder 51 may abut against the housing body 21 as well in a state where the outer force F1 or outer force F2 is not applied. Further, the second card holder 51 may approach the housing body 21 with a relatively minute clearance as well so as to abut by elastic deformation of the housing body 21 when the outer force F1 or outer force F2 is applied. Note, when a clearance is provided, the clearance between the second card holder 51 and the housing body 21 is set smaller than the clearance between the end part projected from the inner wall 21a of the second card C2 and the housing body 21 (or the end part abutted against the inner wall 21a of the cover member 23).

Figure 14:
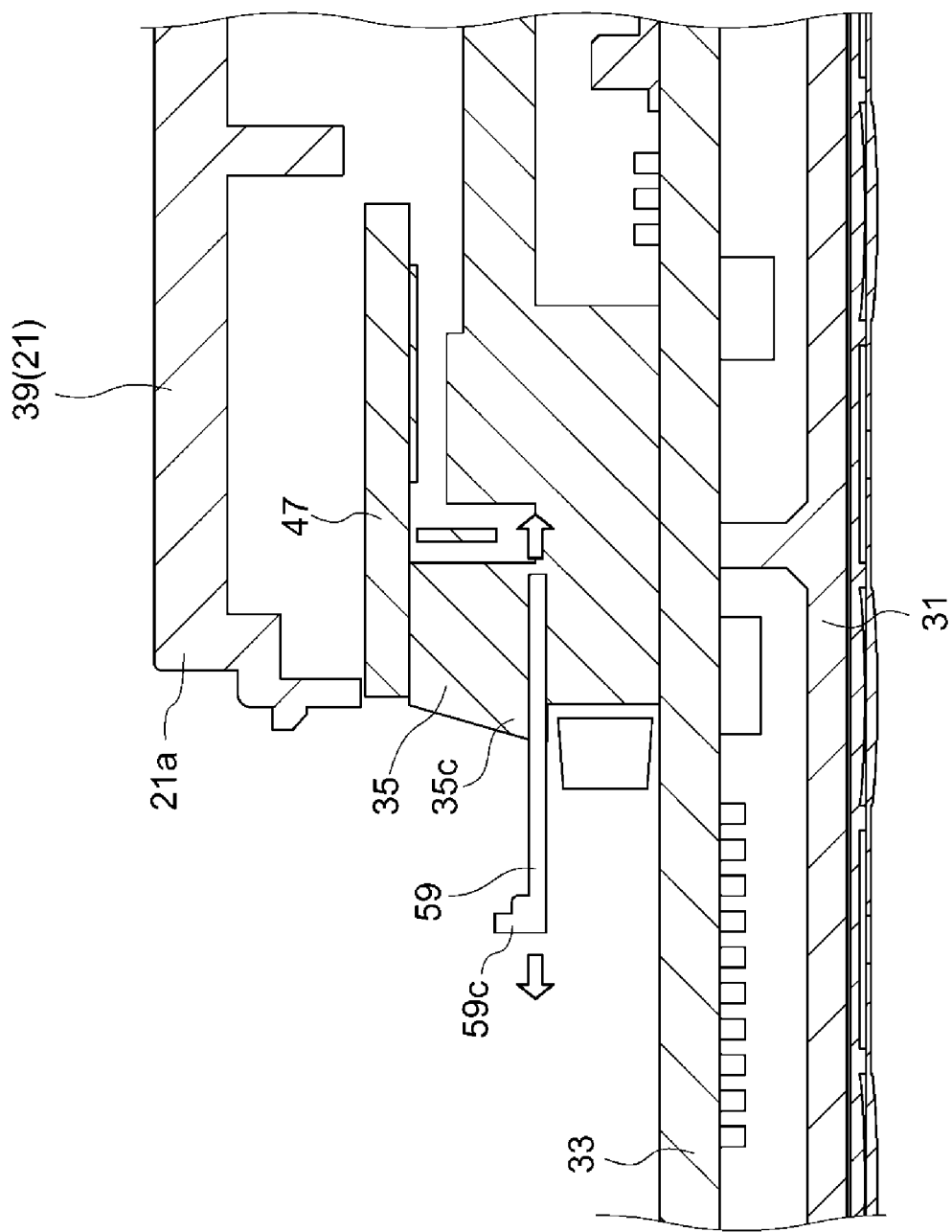
FIG. 14 A cross-sectional view taken along the XIV-XIV line in FIG. 13.

FIG. 13 is a perspective view showing the vicinity of the inner wall 21a when detaching the battery 17 from the battery holding part 19. FIG. 14 is a cross-sectional view along the XIV-XIV line in FIG. 13. Note that, parts are suitably omitted in the diagrams, for example, the sub-board assembly 37 is omitted in FIG. 13.

The mobile phone 1 has a slide member 59 for conveying the first card C1 into the first card insertion part 25. The first card C1 is placed on the surface on the cover member 23 side of the slide member 59 (upper side on the paper surface of FIG. 13 and FIG. 14) and inserted together with the slide member 59 into the first card holder 49 through the first card insertion part 25.

The slide member 59 is formed in a generally plate shape as a whole and is formed in a size large enough to be inserted into the first card insertion part 25 and first card holder 49. As shown in FIG. 13, from the sideward edge parts of the slide member 59, limit parts 59a which are inserted in limit grooves 49a (FIG. 7) formed in the side surfaces of the first card holder 49 project. The limit grooves 49a extend in the insertion direction of the first card C1. At the time of assembly of the mobile phone 1, the slide member 59 is inserted from the first card insertion part 25 into the first card holder 49 in a state elastically deformed so as to reduce the size of the recess part 59b (FIG. 13). Then, the limit parts 59a are inserted into the limit grooves 49a. Due to this, the movable range of the slide member 59 is limited to within a range where the limit parts 59a can move in the limit grooves 49a.

Note that, as shown in FIG. 7, the width of the limit grooves 49a becomes broader toward the opposite side from the sub-board 47 at the center. Therefore, the slide member 59 is positioned at the sub-board 47 side at the pullout limit and insertion limit, the amount of room in the up/down direction (the direction perpendicular to the slide direction) becomes smaller, and separation from the sub-board 47 becomes possible in the middle. As a result, when the first card C1 is placed on the slide member 59 (pullout limit), looseness of the slide member 59 becomes harder to occur, so the first card C1 is easily placed. In the middle of insertion/removal of the slide member 59 (between the pullout limit and the insertion limit), friction between the first card C1 and the sub-board 47 is reduced, insertion is facilitated, and the first card C1 is protected. Further, at the insertion limit, looseness of the slide member 59 becomes harder to occur, so the first card C1 reliably contacts the terminal. Note that, SIM cards and UIM cards are provided with flat terminals on surfaces of the cards (for example, surfaces on the sub-board 47 side).

As shown in FIG. 13 and FIG. 14, the slide member 59 is provided with operated part 59c for making pullout of the slide member easy. The operated part 59c is provided at the edge on the battery holding part 19 side of the plate shaped part of the slide member 59 and projects from the plate shaped part to the cover member 23 side. Namely, the operated part 59c can be hooked by the fingernail or fingertip of the user.

The frame member 35 has a structure for improving the strength of the mobile phone 1 by utilizing the first card insertion part 25. Specifically, this is as follows.

As shown in FIG. 13 and FIG. 14, the end part on the first card insertion part 25 side of the frame member 35 is provided with the engagement part 35c which is inserted in the first card insertion part 25 and engages with the inner wall 21a. The engagement part 35c is, for example, as shown in FIG. 13, inserted in the first card insertion part 25 in the end part near the center of the housing in the longitudinal direction of the first card insertion part 25 (the end part on the battery terminal 43 side in the present embodiment). The engagement part 35c engages with, for example, the portion on the lower side of the paper surface of FIG. 13 (main board 33 side, opposite to the cover member 23) of the edge part of the opening of the first card insertion part 25. The engagement part 35c is formed in, for example, a right triangle shape projecting more to the battery holding part 19 side the more toward the main board 33 side.

By engagement of the frame member 35 with the inner wall 21a, separation of the frame member 35 from the rear case 39 becomes harder to occur. The main board 33 is fixed to the frame member 35 (hole part 35h in FIG. 6) by the screw 45, therefore separation of the main board 33 from the rear case 39 also becomes harder to occur. Note that, as shown in FIG. 13, the engagement part 35c and hole part 35h are arranged adjacent to each other when viewed on a plane.

Note that, the operated part 59c of the slide member 59 explained above is provided at a position where it is superposed over the engagement part 35c in the slide direction of the slide member 59. Therefore, when the slide member 59 moves to the insertion limit, the engagement part 35c is concealed by the operated part 59c.

Figure 15:
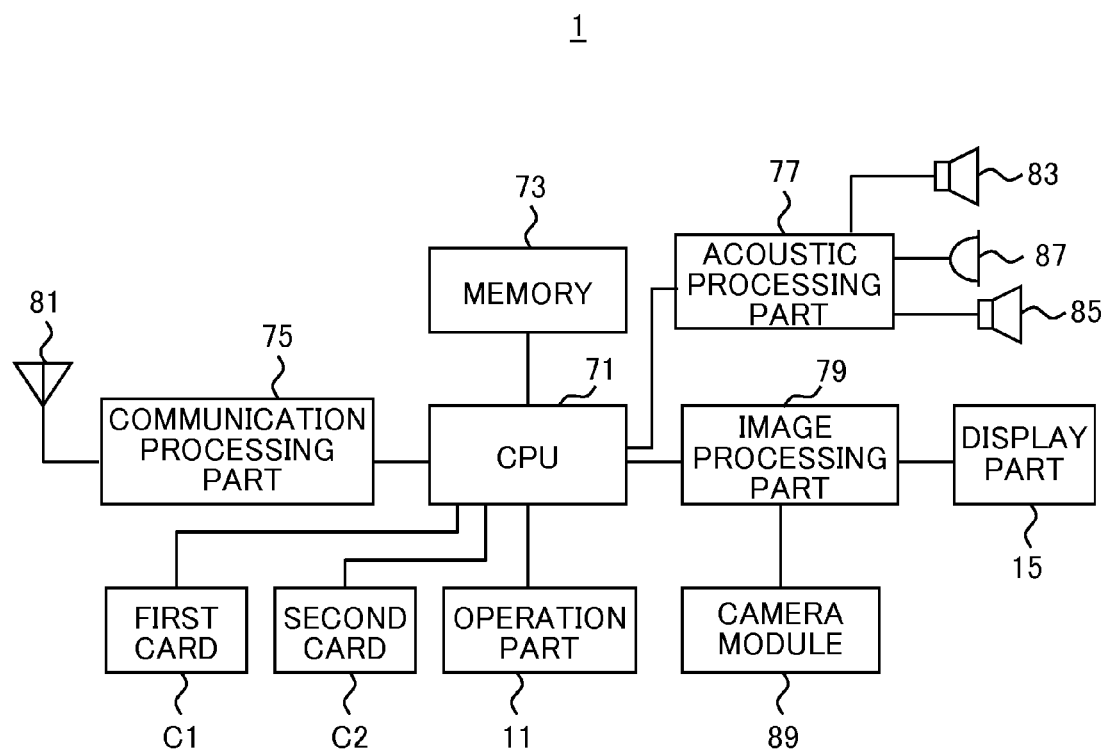
FIG. 15 A block diagram showing the configuration of a signal processing system of the mobile phone of FIG. 1.

FIG. 15 is a block diagram showing the configuration of the signal processing system of the mobile phone 1.

The mobile phone 1 is provided with a CPU 71, memory 73, communication processing part 75, acoustic processing part 77, and image processing part 79. These parts are configured by for example an IC provided on the main board 33.

The CPU 71 and memory 73 function as the control parts performing predetermined computations based on signals from the operation part 11 and other various means and executing control of the image processing part 79 and other various means.

The communication processing part 75 is configured including a high frequency circuit. The communication processing part 75 communicates with another mobile terminal device or a server through a communication system (telephone network or Internet) by wireless communication utilizing signals. Specifically, the communication processing part 75 modulates acoustic data, image data, and other various types of data processed at the CPU 71 and transmits signals obtained by the modulation through an antenna 81. Further, the communication processing part 75 demodulates signals received through the antenna 81 and outputs data obtained by the demodulation to the CPU 71.

When the communication processing part 75 communicates through the telephone network, information stored in the first card C1 is read out and used. Namely, the CPU 71 reads out the information stored in the first card C1 and capable of specifying the phone number linked with the first card C1. The CPU 71 selects the signal to be received based on the read out information and includes in the signal to be transmitted information capable of specifying the sender side (the phone number linked with the first card C1). Note that, the phone number is basically linked with the subscriber of the telephone network, so the information capable of specifying the phone number can be grasped as information capable of specifying the subscriber.

The acoustic processing part 77 converts the acoustic data from the CPU 71 to an electric signal and outputs the electric signal to the speaker 83 for speaking and the speaker 85 for reporting reception etc. The speaker 83 and the speaker 85 convert the electric signal from the acoustic processing part 77 to sound which they then output. On the other hand, the microphone 87 converts input sound to an electric signal and outputs the electric signal to the acoustic processing part 77. The acoustic processing part 77 converts the electric signal from the microphone 87 to acoustic data and outputs the acoustic data to the CPU 71.

The image processing part 79 converts the image data from the CPU 71 to an image signal and outputs the image signal to a display part such as a main display part 15. Further, it converts an imaging signal (image data) output from a predetermined camera module 89 to image data in a predetermined format and outputs the image data to the CPU 71.

Information is suitably written and information is suitably read out to and from the second card C2 in response to an operation on the operation part 11 by the user. For example, the second card C2 records music data and image data downloaded through the communication processing part 75 and image data generated by imaging of the camera module 89. Further, for example, the CPU 71 reads out the music data recorded in the second card C2 and outputs the music data to the acoustic processing part 77 or reads out the image data recorded on the second card C2 and outputs the image data to the image processing part 79.

According to the above embodiment, from a first viewpoint, the following advantageous effects are obtained.

The mobile phone 1 has the housing body 21 having the battery holding part 19 holding the battery 17 formed in it and the cover member 23 covering the battery holding part 19. At the inner wall 21a of one of the inner walls of the battery holding part 19, the second card insertion part 27 is provided in the region which does not face the side surface of the battery 17 when the battery 17 is contained in the battery holding part 19 and the region S2 covered by the cover member 23. The mobile phone 1 can attach the cover member 23 to the battery holding part 19 in the state with the second card C2 inserted in the second card insertion part 27. Therefore, the second card C2 can be removed and inserted while the battery 17 is held in the battery holding part 19 as it is, i.e., in other words, while the power of the mobile phone 1 is on as it is.

Further, the cover member 23 covering the battery 17 can be concurrently used for covering the second card insertion part 27. As a result, for example, it becomes unnecessary to provide a cap especially for the insertion portion of the second card C2, therefore the design property of the appearance is improved and the number of parts is decreased.

In the second card insertion part 27, the guide part 27a guiding the insertion of the card is formed so as to extend to the battery holding part 19 side. The cover member 23 has the cover side extended part 55 which enters into the second card insertion part 27 and can support the portion of the housing body 21 covering the second card C2 (back part) from the second card C2 side. The guide part 27a is configured so that the cover member 23 can be supported by the portion which is not superposed on the second card C2 in the covering direction of the cover member 23 from the internal side of the battery holding part 19. Therefore, as shown in FIG. 12A, the outer force F2 applied to the portion of the housing body 21 covering the second card C2 is propagated through the cover side extended part 55 to the cover member 23 and further propagated to the portion of the guide part 27a which is not superposed on the second card C2. As a result, the outer force F2 is hard to propagate to the second card C2, so breakage of the second card C2 hardly occurs. In the state where the second card C2 is mounted in the second card holder 51, the end part of the card C2 projects from the second card holder 51 to the battery holding part 19 side. Therefore, when a portion at the back part of the housing body 21 on the cover member 23 side is pressed, the second card C2 is directly pressed by the back part of the housing body 21, so there is a concern over breakage. However, occurrence of such breakage is effectively reduced according to the present embodiment.

Further, naturally, even at the time when the outer force F1 (FIG. 12B) is applied to the cover member 23, by support of the cover member 23 by the guide part 27a, the second card C2 is protected.

Figure 16:
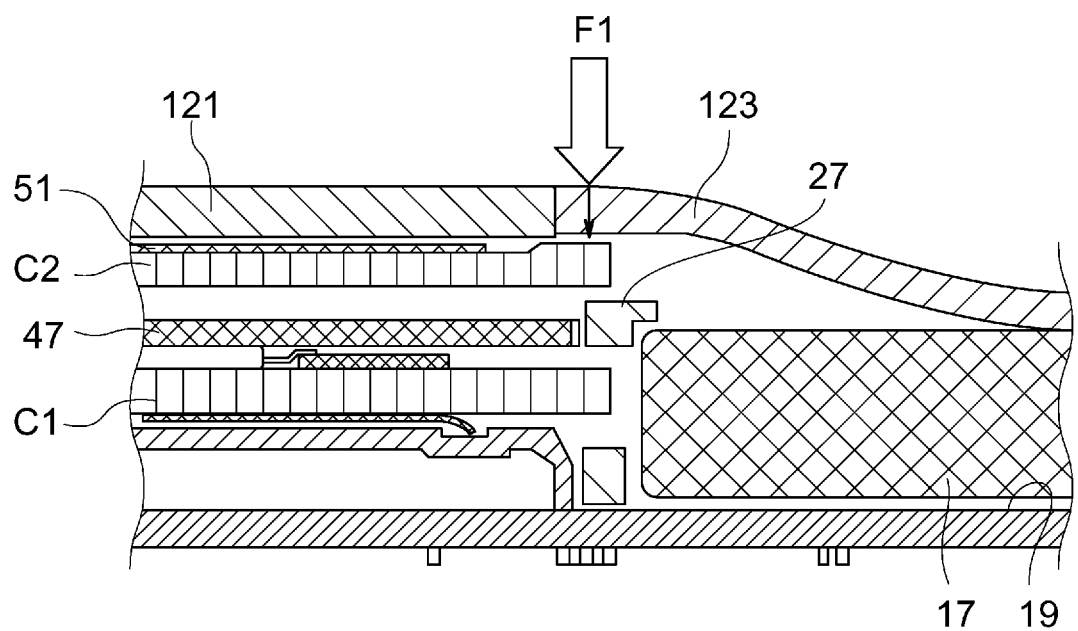
FIG. 16 A cross-sectional view of a mobile phone of a comparative example.

FIG. 16 is a cross-sectional view showing a comparative example for explaining the advantageous effects of the present embodiment. In the mobile terminal device of the comparative example, a cover member 123 is not supported by the guide part 27a. On the other hand, in the second card C2, in the same way as the present embodiment, the end part projects from the inner wall in the state mounted on the second card holder 51, and the end part of the cover member 123 is superposed on this end part. Therefore, when the outer force F1 is applied to the end part of the cover member 123, the cover member 123 is bent downward at the paper surface of FIG. 16 and abuts against the end part of the second card C2, so there is a concern over breakage of the second card C2.

However, as shown in FIG. 12B, in the present embodiment, even when the outer force F1 is applied to the cover member 23, the cover member 23 is supported by the guide part 27a, so breakage of the second card C2 hardly occurs.

Further, bending of the cover member 23 is reduced, so the squeaking noise is reduced. The waterproof property between the inner wall 21a and the cover member 23 is improved by the cover side extended part 55. The distance from the outside of the housing to the inside becomes long due to the cover side extended part 55, so static electricity becomes hard to enter through a gap between the inner wall 21a and the cover member 23.

The second card insertion part 27 is configured so that the end part of the second card C2 projects from the inner wall 21a provided with the second card insertion part 27 to the battery holding part 19 side when the second card C2 is mounted. The cover member 23 is attached to the housing body 21 so that its end part is abutted against the inner wall 21*a* provided with the second card insertion part 27 and this end part is superposed on the end part of the second card C2. The housing body 21 has the housing side extended parts 57 which extend to the battery holding part 19 side from the inner wall 21*a* provided with the second card insertion part 27 and can support the end part of the cover member 23 abutted against the inner wall 21*a*. Therefore, the second card C2 is protected even when outer force is applied to the cover member 23.

As explained with reference to FIG. 16, when the outer force F1 is applied to the end part of the cover member 123, there is a concern over breakage of the second card C2. However, as shown in FIG. 12B, in the present embodiment, the end part of the cover member 23 is supported by the housing side extended parts 57. Therefore, bending of the cover member 23 is reduced and the second card C2 is protected. Further, the housing side extended parts 57 enable improvement of the waterproof property, reduction of entry of static electricity, and other advantageous effects in the same way as the cover side extended part 55 explained above.

The second card insertion part 27 is formed with the direction along the cover member 23 as its long direction. The guide part 27*a* is configured so that the cover member 23 can be supported at the two ends in the longitudinal direction of the second card insertion part 27. For this reason, the cover side extended part 55 supporting the housing body 21 to which the outer force F2 is applied will be supported at the two ends by the guide part 27*a*. Therefore, the outer force F2 can be reliably dispersed to a position not superimposed on the second card C2, so the second card C2 is protected.

The guide part 27*a* is configured so that it can abut against the battery 17 held in the battery holding part 19 from the side covered by the cover member 23. Therefore, the guide part 27*a* not only guides the second card C2 and supports the cover member 23, but also concurrently presses the battery 17. Further, when the outer force F1 or outer force F2 is applied, the back surface of the housing body 21 and the guide part 27*a* supporting the cover member 23 are supported upon the battery 17, therefore the strength of the mobile phone 1 is improved. As a result, smaller size and improvement of strength of the mobile phone 1 are further achieved.

The cover member 23 has the ribs 53 which project from the inner side surface of the cover member 23, can abut against the surface of the cover member 23 side of the battery 17, and can abut against the end part on the battery holding part 19 side of the second card C2 inserted in the second card insertion part 27 in the insertion direction. Therefore, as shown in FIG. 12A and FIG. 12B, the outer force F2 applied to the housing body 21 and the outer force F1 applied to the cover member 23 can be released to the battery 17. Further, detachment of the second card C2 becomes harder (amount of projection of the second card C2 from the second card insertion part 27 is reduced). When attaching the cover member 23 to the housing body 21, the second card C2 may not be completely mounted in the second card holder 51. In this case, the amount of projection of the second card C2 from the second card insertion part becomes larger. However, by sliding the cover member 23 to the inner wall 21*a* side, the second card C2 is pushed by the ribs 53. Namely, the amount of projection of the second card C2 from the second card insertion part 27 is reduced. By suppression of the amount of projection of the second card C2 from the second card insertion part 27 to a predetermined amount or less, the end part of the second card C2 on the battery holding part 19 side becomes harder to abut against a low portion of the inclined part 23*b* of the cover member 23 or the flat plate part 23*a*. As a result, addition of load from the outside of the housing to the end part of the second card C2 becomes a little, so occurrence of breakage of the second card C2 is reduced.

The housing body 21 has the opening edge part 21*n* as the engaging part at the inner wall 21*a* provided with the second card insertion part 27. The cover member 23 has the slide engaged part 23*j* and the press mark 23*k*. The slide engaged part 23*j* engages with the opening edge 21*n* when the cover member 23 is attached to the housing body 21. Further, the slide engaged part 23*j* is configured so that the engagement with the opening edge 21*n* becomes weaker as the position goes toward the inner side surface of the cover member 23 due to the elastic deformation of the cover member 23. The press mark 23*k* is formed on the outer side surface in the region where the slide engaged part 23*j* is provided. Further, the press mark 23*k* is provided at a position where it is not superposed on the second card insertion part 27. Therefore, when detaching the cover member 23, addition of force to the vicinity of the second card insertion part 27 becomes small, so the second card C2 is protected.

At the inner wall 21*a* provided with the second card insertion part 27, the first card insertion part 25 is provided at a position opposite to the side covered by the cover member 23 from the guide part 27*a*. Therefore, due to opening of the first card insertion part 25 in the inner wall 21*a*, there is a concern over lowering of strength of the inner wall 21*a*. However, the inner wall 21*a* is supported by the battery 17 through the guide part 27*a*, so the strength of the inner wall 21*a* is increased.

Further, according to the above embodiment, from a second viewpoint, the following advantageous effects are obtained.

The mobile phone 1 has the housing body 21 having the battery holding part 19 holding the battery 17 formed in it and the cover member 23 covering the battery holding part 19. In the battery holding part 19, the first card insertion part 25 is provided in a region concealed by the battery 17 and the second card insertion part 27 is provided in a region not concealed by the battery 17 when the battery 17 is held in the battery holding part 19. The second card insertion part 27 is covered together with the battery 17 by the cover member 23. Therefore, both of the first card C1 which is not preferably inserted and removed when the power is turned on and the second card C2 which can be inserted or removed when the power is turned on are suitably inserted and removed. Further, a cap for the second card insertion part 27 becomes unnecessary, so the number of parts is decreased.

The second card insertion part 27 is provided at one of the inner walls of the battery holding part 19. Therefore, for example, when the battery holding part 19 is thin type (shape where the inner walls are low and the bottom surface is wide), the present embodiment is more advantageous for making the mobile terminal device thin compared with the aspect wherein the second card insertion part 27 is provided on the bottom surface of the battery holding part 19. Further, for example, when the battery holding part 19 is deep (shape where the inner walls are low and the bottom surface is narrow), in the present embodiment, compared with the aspect wherein the second card insertion part 27 is provided on the bottom surface of the battery holding part 19, it is not necessary to insert it deep in the battery holding part 19, so insertion/removal is easy.

The first card insertion part 25 is provided, in the inner wall 21*a* provided with the second card insertion part 27, in the region facing the side surface of the battery 17 in the state with the battery 17 held in the battery holding part 19. Therefore, advantageous effects the same as advantageous effects by provision of the second card insertion part 27 at the inner wall 21a explained above, that is, advantageous effects of reduction of thickness and facilitation of insertion/removal are obtained. Further, the first card C1 and second card C2 are inserted and removed to/from the same surface and arranged adjacent to each other. As a result, as the entire housing, the structure is simplified, insertion/removal is facilitated, and the size is reduced.

The mobile phone 1 has the sub-board 47 provided in the housing body 21, the first card holder 49 which continues to the first card insertion part 25 and in which the first card C1 inserted from the first card insertion part 25 is mounted, and the second card holder 51 which continues to the second card insertion part 27 and in which the second card C2 inserted from the second card insertion part 27 is mounted. The first card holder 49 is mounted on one surface of the sub-board 47, while the second card holder 51 is mounted on the other surface of the sub-board 47. Therefore, the structure for holding the first card C1 and second card C2 is reduced in size as a whole, and assembly of the mobile phone 1 is facilitated. The technique of stacking the first card holder and second card holder, forming the first card insertion part in the battery holding part, and forming the second card insertion part in the outside of the housing is known. However, in this technique, even the second card holder must be provided at the outside of the housing, so the degree of freedom of design is low. In the present embodiment, however, the second card holder 51 can be arranged at a suitable position so far as it is a position along the inner wall 21a, so the degree of freedom of design becomes higher.

In the second card insertion part 27, the guide part 27a guiding the insertion of the card is formed so as to extend to the battery holding part 19 side. The guide part 27a can engage with the battery 17 held in the battery holding part 19 from the side covered by the cover member 23. Therefore, as explained above, the guide part 27a concurrently presses the battery 17, so the number of parts is decreased and the mobile phone 1 is reduced in size. In addition, the structure becomes one where that the battery 17 is arranged adjacent to the stacked first card holder 49 and second card holder 51, therefore it is made a very compact size as a whole.

The mobile phone 1 has the battery terminal 43 which is exposed from the inner wall 21a provided with the second card insertion part 27 to the battery holding part 19, contacts the battery 17, and is supplied with electric power from the battery 17. By the biasing force of the battery terminal 43, the battery 17 and the battery terminal 43 reliably become conductive. When the battery 17 is mounted in the battery holding part 19, it is fit in the battery holding part 19 from the end part on the inner wall 21a side. After this end part is pushed against the battery terminal 43, the end part opposite to the inner wall 21a is fit in the battery holding part 19. At this time, due to the biasing force of the battery terminal 43, floating of the end part on inner wall 21a side of the battery 17 is reduced by the guide part 27a, so the battery 17 is easily mounted.

The cover member 23 has the ribs 53 which project from the inner side surface of the cover member 23, can abut against the surface of the battery 17 on the cover member 23 side, and can abut against the end part of the second card C2 inserted in the second card insertion part 27 in the insertion direction on the battery holding part 19 side. Therefore, detachment of the first card C1 is reduced by the battery 17. Further, floating of the battery 17 and detachment of the second card C2 are reduced by the cover member 23. Namely, detachment of the first card C1 and second card C2 is reduced by the cover member 23, and the mobile phone 1 is reduced in size.

The mobile phone 1 has the communication part (CPU 71 and communication processing part 75) communicating with another mobile terminal device through a communication system (telephone network etc.) and the operation part 11 accepting operation of the user. The first card C1 is the card storing the information referred to by the CPU 71 and capable of specifying the subscriber (phone number) of the communication system. The second card C2 is the card for which writing and reading are carried out in response to the input operation to the operation part 11. Therefore, the mobile phone 1 can suitably mount an SIM card etc. the insertion/removal of which in the powered state is not preferred, and an SD card etc., for which insertion/removal is preferably carried out in the powered state.

Further, according to the above embodiment, from a third viewpoint, the following advantageous effects are obtained.

The mobile phone 1 has the housing body 21 having the battery holding part 19 holding the battery 17 formed in it, the cover member 23 covering the battery holding part 19, the main board 33 provided in the housing body 21, the first card holder 49 which is provided in the housing body 21 and in which the first card C1 is inserted, and the frame member 35 provided in the housing body 21, fixed to the main board 33, and holding the first card holder 49. At the inner wall 21a of one of the inner walls of the battery holding part 19, the first card insertion part 25 continuing to the first card holder 49 is provided. The frame member 35 has the engagement part 35c which is inserted in the first card insertion part 25 and engages with the inner wall 21a. Therefore, displacement of the main board 33 relative to the housing body 21 is reduced through the frame member 35 holding the first card holder 49. In general, fastening the main board 33 to the housing body 21 by forming a screw boss at the center of the housing body 21 and inserting a screw is difficult from the viewpoints of securing internal space of the housing body 21 and design of the housing surface. In the present embodiment, however, the main board 33 is engaged with the housing body 21 by utilizing the formation the first card insertion part 25 and the inner wall 21a provided at relatively the center of the housing body 21. Therefore, the main board 33 can be fixed to the housing body 21 without causing an increase of the number of parts, reduction of the internal space of the housing body 21, lowering of the degree of freedom of design of the surface of the housing body 21, and other disadvantages. As a result, when a shock is applied to the mobile phone 1, for example, at the time when the mobile phone 1 is dropped, occurrence of positional deviation of the main board 33 and breakage due to bending are reduced. In the present embodiment, from the viewpoint of reduction of thickness of the mobile phone 1, the main board 33 is provided from the second region part 3b to the first region part 3a and configures the bottom part of the battery holding part 19. For this reason, the main board 33 becomes easy to bend in a direction of separation from the rear case 39 due to the load of the battery 17. However, since separation from the rear case 39 is made harder to occur at the center of the main board 33, lowering of strength due to reduction of thickness is compensated for, and reduction of thickness and maintenance of strength are achieved.

The first card insertion part 25 is provided, among the inner walls of the battery holding part 19, in the region where it faces the side surface of the battery 17 when the battery 17 is held in the battery holding part 19. Therefore, entry of dust or moisture to the internal side of the housing from the first card insertion part 25 is suppressed by the battery 17. Therefore, even if the first card insertion part 25 is further expanded from a size large enough to insert only the first card C1 to a size capable of inserting the engagement part 35c, dust and moisture hardly enter it.

At the inner wall 21a provided with the first card insertion part 25, the second card insertion part 27 is provided in a region not concealed by the battery 17 and the region S2 covered by the cover member 23. In the housing body 21, the second card holder 51 in which the second card C2 inserted from the second card insertion part 27 is mounted is provided. Therefore, insertion/removal of the second card C2 such as an SD card becomes possible with the battery 17 held in the battery holding part 19. Then, the engagement part 35c inserted in the first card insertion part 25 is concealed by the battery 17, so the engagement part 35c is not viewed when the second card C2 is inserted and removed, therefore the design property is not lowered by the engagement part 35c.

The mobile phone 1 has the sub-board 47 provided in the housing body 21. The first card holder 49 is mounted on one surface of the sub-board 47, while the second card holder 51 is mounted on the other surface of the sub-board 47. The frame member 35 holds the sub-board 47. Therefore, the structure relating to card insertion is reduced in size and the assembly is facilitated. Further, by engagement of the frame member 35 with the inner wall 21a, positioning of the first card holder 49 and second card holder 51 to the first card insertion part 25 and second card insertion part 27 is reliably carried out as well. Consequently, impossible insertion/removal of the first card C1 and second card C2 due to falling or other shock hardly even occurs.

The mobile phone 1 has the slide member 59 on which the first card C1 is mounted and which is inserted and removed to/from the first card insertion part 25 by slide movement with respect to the first card holder 49. The slide member 59 has the operated part 59c exposed through the first card insertion part 25 at the battery holding part 19. The operated part 59c is formed at a position overlapping the engagement part 35c in the slide direction. Therefore, the engagement part 35c functions as a stopper as well. This makes deep entry of the operated part 59c into the first card insertion part 25 hard. As a result, the ease of detachment of the first card C1 can be secured while simplifying the structure.

The mobile phone 1 has the communication part (CPU 71 and communication processing part 75) communicating with another mobile terminal device through the communication system (telephone network etc.) The first card C1 is the card referred to by the CPU 71 and storing information capable of specifying the subscriber (phone number) of the communication system. Therefore, the strength of the mobile phone 1 can be improved by the insertion part for inserting and removing the conventional SIM card etc.

Note that, in the above embodiment, the mobile phone 1 is one example of the mobile terminal device of the present invention, the housing body 21 is one example of the housing of the present invention, the second card insertion part is one example of the first card insertion part of the present invention, the first card insertion part is one example of the second card insertion part of the present invention, the second card holder 51 is one example of the first card holder of the present invention, the first card holder 49 is one example of the second card holder of the present invention, the sub-board 47 is one example of the circuit board of the present invention, the opening edge 21n is one example of the cover use engaging part of the present invention, the slide engaged part 23j is one example of the cover use engaged part of the present invention, the CPU 71 and communication processing part 75 are one example of the communication part of the present invention, and the engagement part 35c is one example of the frame use engagement part of the present invention.

The present invention is not limited to the above embodiments and can be executed in various ways.

The mobile terminal device is not limited to a mobile phone. For example, it may be a PDA, digital camera, or game machine as well. The housing is not limited to one of a thin box shape and may be one with any suitable shape. Further, the housing (first housing 3 or housing body 21) is not limited to one having two regions of different thicknesses (first region part 3a and second region part 3b) and may be one having a uniform thickness. In the present invention, the card insertion part concealed by the battery (first card insertion part 25) is not an indispensable factor.

The card insertion part is not limited to one provided at the inner wall of the battery holding part. Further, the second card insertion part concealed by the battery is not limited to one facing the side surface of the battery. For example, the first card insertion part and second card insertion part may be provided on the bottom of the battery holding part as well. Note, if the first card insertion part and second card insertion part are provided on the inner wall of the battery holding part, there is the merit for example of easy achievement of a reduction of size and a reduction of thickness of the mobile terminal device by providing the first card insertion part and second card insertion part stacked.

The battery is not limited to one of a thin box shape, and the battery holding part is not limited to one having low inner walls and a wide bottom part. Note that, the thickness where the card insertion part is concealed by the thickness of the battery designates the thickness of the battery in the depth direction of the battery holding part (height direction of the inner wall) and does not designate the thickness in the thickness direction among the long direction, short direction, and thickness direction of the battery in a case where the battery is a thin box shape or the like. In the same way, the side surface where the card insertion part faces the side surface of the battery designates the surface of the battery facing the inner peripheral surface of the battery holding part (the surface which is not the bottom surface) and does not designate the side surface between the main surface and side surface of the battery in the case where the battery is a thin box shape or the like.

The card may be one having only a memory function, one having a CPU mounted in it, one equipped with a logic device (one having an access control function), or another suitable one. The posture of the card is not limited to the posture facing the side covered by the cover member. In other words, the card insertion part is not limited to one formed with the direction along the cover member as its longitudinal direction. For example, the posture of the card may be one perpendicular to the cover member as well. Note that, making the posture of the card one facing the side covered by the cover member is advantageous for making the inner walls low and make the housing thin.

The guide part (27a) guiding the insertion of the card may be formed to any suitable shape and is not limited to one abutting against the surface of the card on the internal portion side of the housing and sideward. For example, in the embodiments, either of the sideward guide part 27b or inside guide part 27c may be provided as well. Further, the inner side surface of the cover member may be formed to a suitable shape, and the ribs (53) are not indispensable requirements. When the ribs are provided, the shapes of the ribs may be made suitable shapes.

The press mark is not limited to the projecting part projecting from the outer side surface of the cover member. For example, the press mark may be a recessed part or a seal or other pattern adhered to the cover member as well. Note, if the press mark is a projecting part, it is easy to apply force to the press mark so as to slide the cover member along the surface.

The engaged part (23j) weakened in engagement by the press mark of the cover member is not limited to one having a projecting part projecting to the outer side surface of the cover member. For example, a hole part may be provided in the engaged part of the cover member, and an engaging part which is inserted into that hole part from the outer side surface side of the cover member to the inner side surface side for engagement with it may be provided in the housing (housing body) as well.

The card insertion part engaged by the frame member is not limited to one concealed by the battery and may be one not concealed by the battery as well. For example, in the embodiments, the frame member may be engaged with the second card insertion part 27 as well.

The battery terminal is not limited to the ones exemplified in the embodiments and may be configured by a spring pin, spring terminal, or other suitable terminal.

The communication system is not limited to the telephone network. For example, the communication system may be the Internet as well. Further, the communication system is not limited to one administered by a carrier or one performed through a server and may be a system for directly communicating between mobile terminal devices as well.

The invention claimed is:

1. A mobile terminal device comprising:
   a housing having a battery holding part holding the battery;
   a cover member removably attachable to the housing and configured to cover the battery holding part when attached to the housing,
   the battery holding part having a first card insertion part in a region not concealed by the battery and a second card insertion part in a region concealed by the battery when the battery is held in the battery holding part,
   the first card insertion part being configured to allow insertion of a card when the battery is held in the battery holding part and the cover member is not attached to the housing, and the second card insertion part being configured to prevent insertion of a card when the battery is held in the battery holding part, and
   the first card insertion part in which the card is inserted is covered together with the battery by the cover member when the cover member is attached to the housing.

2. The mobile terminal device as set forth in claim 1, wherein:
   the battery has opposite inner and outer faces and a peripheral edge, the battery holding part comprises a recess configured for receiving the battery with the outer face of the battery facing outward from the recess, the recess having inner walls and the first card insertion part is provided in a region of an inner wall of the battery holding part which is spaced outwardly from the outer face of the battery and not facing a peripheral edge of the battery when the battery is held in the battery holding part.

3. The mobile terminal device as set forth in claim 2, wherein:
   the first card insertion part has a guide part extending to the battery holding part side and guiding insertion of the card,
   the cover member has a cover side extended part which enters into the first card insertion part and can support a portion of the housing covering the card from the card side, and
   the guide part is configured so that the cover member can be supported by a portion of the guide part not superposed over the card from the internal portion side of the battery holding part.

4. The mobile terminal device as set forth in claim 3, wherein:
   the first card insertion part is configured so that an end part of a mounted card projects from the inner wall provided with the first card insertion part to the battery holding part side,
   the cover member is attached to the housing in a state where the end part is abutted against the inner wall provided with the first card insertion part and that abutted end part is superposed on the end part of the card, and
   the housing has a housing side extended part which is extended from the inner wall provided with the first card insertion part to the battery holding part side and can support the end part of the abutted cover member from the battery side.

5. The mobile terminal device as set forth in claim 3, wherein:
   the first card insertion part opens so that its longitudinal direction becomes the direction along the cover member, and
   the guide part is configured so that the cover member can be supported at two ends of the guide part in the longitudinal direction of the first card insertion part.

6. The mobile terminal device as set forth in claim 2, wherein:
   the first card insertion part has a guide part extending to the battery holding part side and guiding insertion of the card, and
   the guide part is configured so that it can abut against the battery held in the battery holding part from the side covered by the cover member.

7. The mobile terminal device as set forth in claim 6, further comprising:
   a battery terminal exposed to the battery holding part from the inner wall provided with the first card insertion part and supplied with electric power from the battery by contacting the battery.

8. The mobile terminal device as set forth in claim 2, wherein:
   the first card insertion part has a guide part extending to the battery holding part side and guiding insertion of the card, and
   the cover member has a rib which projects from the inner side surface of the cover member, can abut against the surface of the battery on the cover member side, and can abut against the end part on the battery holding part side of the card inserted in the first card insertion part in the insertion direction.

9. The mobile terminal device as set forth in claim 3, wherein:
   the housing has a cover use engaging part at the inner wall provided with the first card insertion part,
   the cover member has
   a cover use engaged part configured so that it engages with the cover use engaging part when the cover member is attached to the housing, and engagement with the cover use engaging part becomes weaker as the position goes toward the inner side of the cover member due to elastic deformation of the cover member, and
   a press mark formed on an outer side surface of the cover member in a region where the cover use engaged part is provided, and the press mark is provided at a position not superposed on the first card insertion part.

10. The mobile terminal device as set forth in claim 1, wherein:

the second card insertion part is provided, in the inner wall provided with the first card insertion part, in a region facing the side surface of the battery held in the battery holding part.

11. The mobile terminal device as set forth in claim 10, further comprising:

a first card holder which continues to the first card insertion part and in which the card inserted from the first card insertion part is mounted, a second card holder which continues to the second card insertion part and in which the card inserted from the second card insertion part is mounted, and a circuit board on one surface of which the first card holder is mounted and on the other surface of which the second card holder is mounted.

12. The mobile terminal device as set forth in claim 1, further comprising:

a communication part communicating with another mobile terminal device through a communication system and an operation part accepting operation by a user, wherein the card inserted in the first card insertion part is a card storing information referred to by the communication part and capable of specifying a subscriber of the communication system, and the card inserted in the second card insertion part is a card for which writing and reading are performed in response to an input operation to the operation part.

13. The mobile terminal device as set forth in claim 1, further comprising:

a main board provided in the housing, a second card holder which is provided in the housing and in which the card inserted from the second card insertion part is mounted, and a frame member provided in the housing, fixed to the main board, and holding the second card holder, wherein the frame member has a frame use engagement part inserted in the second card insertion part and engaging with the inner wall.

14. The mobile terminal device as set forth in claim 13, further comprising:

a slide member on which the card is placed and which is inserted and removed to/from the second card insertion part by slide movement with respect to the second card holder, wherein the slide member has an operated part exposed at the battery holding part through the second card insertion part in a state where the placed card is mounted in the second card holder, and the operated part is formed at a position superposed over the frame use engagement part in the slide direction.

* * * * *